US006822934B2

(12) United States Patent
Nishiwaki et al.

(10) Patent No.: US 6,822,934 B2
(45) Date of Patent: Nov. 23, 2004

(54) OPTICAL DISC APPARATUS FOR FINDING A TRACKING ERROR FOR AN OPTICAL DISK

(75) Inventors: Seiji Nishiwaki, Osaki (JP); Yoichi Saito, Hirakata (JP); Kazuo Momoo, Hirakata (JP); Kenji Nagashima, Takasuki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/884,890

(22) Filed: Jun. 19, 2001

(65) Prior Publication Data

US 2002/0009023 A1 Jan. 24, 2002

(30) Foreign Application Priority Data

Jun. 21, 2000 (JP) ........................................ 2000-185830

(51) Int. Cl.[7] .............................................. G11B 7/00
(52) U.S. Cl. ................................ 369/44.23; 369/44.32; 369/44.35; 369/44.41
(58) Field of Search .......................... 369/44.23, 44.32, 369/44.35, 44.41, 44.42, 112.12

(56) References Cited

U.S. PATENT DOCUMENTS

| | | | | |
|---|---|---|---|---|
| 5,278,401 A | * | 1/1994 | Takishima et al. | 250/201.5 |
| 5,289,446 A | * | 2/1994 | Dekker et al. | 369/44.25 |
| 5,353,267 A | * | 10/1994 | Katayama | 369/13.32 |
| 5,568,458 A | * | 10/1996 | Tani et al. | 369/44.35 |
| 5,623,462 A | * | 4/1997 | Tezuka et al. | 369/44.23 |
| 5,737,296 A | * | 4/1998 | Komma et al. | 369/44.23 |
| 5,737,297 A | * | 4/1998 | Mashiyama et al. | 369/112.24 |
| 5,745,449 A | * | 4/1998 | Koyama | 369/44.32 |
| 5,748,599 A | * | 5/1998 | Yamamoto et al. | 369/112.12 |
| 6,185,167 B1 | * | 2/2001 | Arai et al. | 369/44.23 |
| 6,418,095 B1 | * | 7/2002 | Sano et al. | 369/44.32 |

FOREIGN PATENT DOCUMENTS

JP                 62229533 A   *   10/1987   ............ G11B/7/09

\* cited by examiner

Primary Examiner—William Klimowicz
Assistant Examiner—Peter Vincent Agustin
(74) Attorney, Agent, or Firm—Renner, Otto, Boisselle & Sklar, LLP

(57) ABSTRACT

An optical disc apparatus capable of mounting an optical disc includes a light source for emitting light; an objective lens for collecting the light emitted by the light source on the optical disc; a first light distribution section integrally movable with the objective lens, the first light distribution section including a first area and a second area, the first light distribution section outputting the light reflected by the optical disc and transmitted through the first area or the second area as transmission light, outputting the light reflected by the optical disc and diffracted by the first area as first diffraction light, and outputting the light reflected by the optical disc and diffracted by the second area as second diffraction light; a transmission light detection section for detecting the transmission light and outputting a TE1 signal indicating an offset of the detected transmission light; a first diffraction light detection section for detecting the first diffraction light and the second diffraction light, and outputting a TE2 signal indicating a difference between a light amount of the detected first diffraction light and a light amount of the detected second diffraction light; and a control device for generating a tracking error signal for the optical disc based on the TE1 signal and the TE2 signal.

24 Claims, 22 Drawing Sheets

OPTICAL DISC APPARATUS FOR FINDING A TRACKING ERROR FOR AN OPTICAL DISK

BACKGROUND OF THE INVENTION

1. Field of the Invention

The present invention relates to an optical disc apparatus, and in particular to an optical disc apparatus for finding an accurate tracking error signal for an optical disc.

2. Description of the Related Art

An optical disc is known as an information recording medium for storing a large amount of data. An optical disc can store information on tracks thereof, and also allow information recorded thereon to be reproduced. An optical disc apparatus is capable of mounting an optical is other on and is used for recording information on the optical disc and/or reproducing information stored on the optical disc. In order to allow the optical disc apparatus to record information to or reproduce information from an appropriate track accurately, a laser beam needs to accurately follow the tracks on the optical disc. The operation of the laser beam to follow the tracks on the optical disc is referred to as "tracking". A tracking error signal shows whether the laser beam is accurately following the tracks on the optical disc.

Hereinafter, a conventional optical disc apparatus and a tracking error signal provided by the conventional optical disc apparatus will be described.

FIG. 10A shows a conventional optical disc apparatus 1000. Laser light emitted by a laser light source 1010 is converged on an optical disc 1070 through an optical system 1015. The light reflected by the optical disc 1070 is detected by a photodetector 1050. Based on a result detected by the photodetector 1050, a control device 1085 controls an element or elements among the light source 1010, the optical system 1015, and the optical disc 1070 as necessary. The optical system 1015 includes, for example, a polarizing beam splitter 1020 having a splitting face 1025, a collimator lens 1030, a quarter-wave plate 1042, a reflecting mirror 1040, and an objective lens 1060.

A more specific operation of the optical disc apparatus 1000 will be described.

Laser light emitted by the light source 1010 is incident on the polarizing beam splitter 1020, transmitted through the splitting face 1025 of the polarizing beam splitter 1020, and then converted into parallel light by the collimator lens 1030. The parallel light, which is linearly polarized (P wave) is converted into circular polarization, by the quarter-wave plate 1042, and then reflected by the reflecting mirror 1040. The reflected light is converged by the objective lens 1060 on a signal face 1074 of the optical disc 1070.

The optical disc 1070 has the signal face 1074 between a substrate 1072 and a protection film 1076. The signal face 1074 has pits (or grooves) formed in a diameter direction of the optical disc 1070 (indicated by arrow X). The pits each have a depth d and a width w, and are arranged at a pitch p. The diameter direction of the optical disc 1070 is perpendicular to the direction of the light incident on the optical disc 1070 and parallel to the sheet of paper of FIG. 10A.

The light reflected by the signal face 1074, which is circular polarization, is transmitted through the objective lens 1060, reflected by the reflecting mirror 1040, and then converted into linear polarization (S wave) by the quarter-wave plate 1042. The light is made convergent by the collimator lens 1030, reflected by the splitting face 1025 of the polarizing beam splitter 1020, and then collected on the photodetector 1050 as light 1080. Based on a signal detected by the photodetector 1050, the control device 1085 controls an element or elements among the light source 1010, the optical system 1015, and the optical disc 1070 as necessary.

In FIG. 10A, reference numeral 1210 represents an optical axis of the optical disc apparatus 1000.

FIG. 10B shows a structure of the photodetector 1050. The photodetector 1050 includes sub-photodetectors 1050A and 1050B. A separation line 1051 shows the border between the sub-photodetectors 1050A and 1050B. The sub-photodetector 1050A and 1050B each provide a respective light amount. A tracking error signal $1091s$ (TE1 signal) is obtained by subjecting the light amounts provided by the sub-photodetectors 1050A and 1050B to subtraction performed by a subtracter 1091. A reproduction signal 1092 is obtained by subjecting the light amounts provided by the sub-photodetectors 1050A and 1050B to addition performed by an adder 1092. The separation line 1051 substantially equally divides a convergence spot 1081 on the photodetector 1050. The control device 1085 controls an element or elements among the light source 1010, the optical system 1015, and the optical disc 1070 as necessary, so as to make the level of the TE1 signal zero in order to eliminate a tracking error.

FIG. 11A shows another conventional optical disc apparatus 1100. Laser light emitted by a laser light source 1110 is converged on an optical disc 1170 through an optical system 1115. The light reflected by the optical disc 1170 is detected by a photodetector 1190, Based on a result detected by the photodetector 1190, a control device 1185 controls an element or elements among the light source 1110, the optical system 1115, and the optical disc 1170 as necessary. The optical system 1115 includes, for example, a collimator lens 1130, a quarter-wave plate 1142, a polarizing holographic element 1145, and an objective lens 1160.

A more specific operation of the optical disc apparatus 1100 will be described.

Laser light emitted by the light source 1110 is converted into parallel light by the collimator lens 1130 and incident on the polarizing holographic element 1145.

The polarizing holographic element 1145 is integrated into a lens holder 1165 together with the objective lens 1160. The polarizing holographic element 1145 has the quarter-wave plate 1142. A surface of the polarizing holographic element 1145 is a polarizing holographic face 1150.

The light, which is linear polarization (P wave) incident on the polarizing holographic element 1145 is transmitted through the polarizing holographic face 1150 and converted into circular polarization by the quarter-wave plate 1142, collected by the objective lens 1160, and then converged on a signal face 1174 of the optical disc 1170.

The optical disc 1170 has the signal lace 1174 between a substrate 1172 and a protection film 1176. The signal face 1174 has pits (or grooves) formed in a rotation direction of the optical disc 1170. The pits each have a depth d and a width w, and arranged at a pitch p.

The light reflected by the signal face 1174, which is circular polarization, is transmitted through the objective lens 1160, converted into linear polarizatlon (S wave) by the quarter-wave plate 1142, and then diffracted by the polarizing holographic face 1150. The diffraction light is transmitted through the collimator lens 1130 and incident on the photodetector 1190. Based on a signal detected by the photodetector 1190; the control device 1185 controls an element or elements among the light source 1110, the optical system 1115, and the optical disc 1170 as necessary.

FIG. 11B shows a structure of the polarizing holographic face 1150. The polarizing holographic face 1150 includes two areas 1150a and 1150b which are separated from each other by a separation line 1152. The light reflected by the optical disc 1170 is substantially equally divided into two by the separation line 1152.

FIG. 11C shows a structure of the photodetector 1190. The photodetector 1190 includes two sub-photodetectors 1190A and 1190B separated from each other by a separation line 1191. The light diffracted by the area 1150a (FIG. 11B) of the polarizing holographic face 1150 is collected on the sub-photodetector 1190A as a spot 1181a. The light diffracted by the area 1150b (FIG. 11B) of the polarizing holographic face 1150 is collected on the sub-photodetector 1190B as a spot 1181b. The sub-photodetectors 1190A and 1190B each provide a respective light amount. A tracking error signal 1101s (TE2 signal) is obtained by subjecting the light amounts provided by the sub-photodetectors 1190A and 1190B to subtraction performed by a subtracter 1101. A reproduction signal 1102B is obtained by subjecting the light amounts provided by the sub-photodetectors 1190A and 1190B to addition performed by an adder 1102. The control device 1185 controls an element or elements among the light source 1110, the optical system 1115, and the optical disc 1170 as necessary, so as to make the level of the TE2 signal zero in order to eliminate a tracking error.

The tracking error signals (TE1 signal and TE2 signal) obtained by the conventional optical disc apparatuses 1000 and 1100 have the following problems. First, the tracking error signal obtained by the conventional optical disc apparatus 1000 (TE1 signal) will be described.

Generally in the optical disc 1000, in which the control device 1085 performs tracking control, when the optical disc 1070 vibrates with respect to the center thereof, the objective lens 1060 follows the vibration and is shifted in the diameter direction K (FIG. 10A).

FIG. 12 (parts (a) through (d)) shows light intensity distributions of a cross-section of the optical disc 1070 when a central axis 1220 (part (e)) of the objective lens 1060 is shifted rightward by distance X with respect the optical axis 1210 of the optical disc apparatus 1000 (FIG. 1). The cross-section is taken along the diameter direction of the optical disc apparatus 1070. Part (e) schematically shows the positional relationship between the optical axis 1210 and the central axis 1220 of the objective lens 1060.

In FIG. 12, part (a) shows a light intensity distribution 1231 before the light emitted by the light source 1030 is transmitted through the objective lens 1060. The light intensity distribution 1231 exhibits a Gaussian distribution with the optical axis 1210 as the center. At this point, as shown in part (e), the central axis 1220 of the objective lens 1060 is shifted by distance X with respect to the optical axis 1210 of the optical disc apparatus 1000.

Part (b) shows a light intensity distribution 1232 after the light is transmitted through the objective lens 1060. When the objective lens 1060 has a radius (aperture radius) of length r, the light intensity distribution 1232 is zero at a position farther than distance r from the central axis 1220 of the objective lens 1060. In other words, the light outer aperture rims 1240 and 1250 of the objective lens 1060 are shielded.

Part (c) shows a light intensity distribution 1233 after the light is reflected by the optical disc 1070 and before being incident on the objective lens 1060. A central axis 1215 of the light reflected by the optical disc 1070 is shifted rightward by distance X with respect to the central axis 1220 of the objective lens 1060. In other words, the central axis 1215 of the light reflected by the optical disc 1070 is shifted rightward by distance 2X with respect to the optical axis 1210 of the optical disc apparatus 1000. The light intensity distribution 1233 is spread in the diameter direction of the optical disc 1070 due to the diffraction at the pits on the signal face 1074 of the optical disc apparatus 1070.

Part (d) shows a light intensity distribution 1234 after the light is transmitted through the objective lens 1060. As in part (b), the light outside the aperture rime 1240 and 1250 of the objective lens 1060 is shielded.

When distance X is zero, the tracking of the optical disc 1070 is accurately controlled by controlling the level of the tracking error signal (TE1 signal) obtained by the photodetector 1050 (FIG. 10B) to be zero. However, when distance X is not zero, a tracking offset is generated.

As described above, the tracking error signal (TE1 signal) obtained by the photodetector 1050 (FIG. 10B) shows a difference in the light amounts detected by the sub-photodetectors 1050A and 1050B. When a distance X exists between the optical axis 1210 and the central axis 1220 of the objective lens 1060, the light amount detected by the sub-photodetector 1050A corresponds to an area of a pattern ABCD formed by connecting points A, B, C and D (part (d)), and the light amount detected by the sub-photodetector 1050B correspond to an area of a pattern CDEF formed by connecting points C, D, E and P.

The tracking error signal (TE2 signal) obtained by the photodetector 1190 of the optical disc apparatus 1100 (FIG. 11A) is also shifted in a similar manner when there is a distance between an optical axis of the optical disc apparatus 1100 and a central axis of the objective lens 1160 for the following reason.

The tracking error signal (TE2 signal) obtained by the photodetector 1190 (FIG. 11C) shows a difference in the light amounts detected by the sub-photodetectors 1190A and 1190B. When a distance X exists between the optical axis of the optical disc apparatus 1100 and the central axis of the objective lens 1160, the light amount detected by the sub-photodetector 1190A correspond to an area of a pattern formed by connecting points A, B, C' and D' (part (d)), and the light amount detected by the sub-photodetector 1090B correspond to an area of a pattern formed by connecting points C', D', E and F. The tracking error signal provided by the photodetector 1190 (TE2 signal) is not offset as much as the tracking error signal provided by the photodetector 1050 (TE1 signal) but is still offset significantly.

FIG. 13A is a graph illustrating the degree of asymmetry of the waveform of the tracking error signal when the laser light crosses the pits (when tracking is off). In FIG. 13A, distance X between the optical adds 1210 of the optical disc apparatus 1000 and the central axis 1220 of the objective lens 1060 is assumed to be 100 $\mu$m. The degree of asymmetry is represented as contours. The degree of asymmetry is obtained by expression (H−L)/(H+L), where H is a level of the signal output (indicated by reference numeral 1300) shown in FIG. 13B above the ground level GND, and L is a level of the signal output shown in FIG. 13B below the ground level GND.

In FIG. 13A, the horizontal axis represents the width of the pits w of the optical disc 1070, and the vertical axis represents the depth of the pits (d×refractive index of the substrate 1072 of the optical disc 1070, see FIG. 10A). The parameters for the calculation obtained for the results shown in FIG. 13A are as follows: the numerical aperture (NA) of the objective lens 1060=0.60; the wavelength λ of the light source 1010=0.66 μm; the pitch (P) of the pits of the optical disc 1070=0.74 μm. At point R (where the width w of the pits is 0.30 μm and the depth of the pits is λ/10), the degree of asymmetry of the tracking error signal is 0.52. This corresponds to the difference between the areas of the pattern ABCD and the pattern CDEF shown in part (d) of FIG. 12. As can be appreciated, in the optical disc apparatus 1000 including the photodetector 1050, the central axis 1220 of the objective lens 1060 is shifted with respect to the optical axis 1210 of the optical disc apparatus 1000 in the direction of arrow X (FIG. 1A). As a result, a significant degree of asymmetry of the tracking error signal occurs, and therefore control of tracking becomes unstable. While tracking control is performed, very large off-track may be undesirably generated. This causes a tracking error signal from an adjacent track to be leaked (i.e., crosstalk is increased) and deteriorates the reproduction performance, or causes a part of a signal mark of an adjacent track to be overwritten or erased.

FIG. 14 is a graph illustrating the degree of asymmetry of the waveform of the tracking error signal generated when the photodetector 1190 in the optical disc apparatus 1000 issused. The conditions are the same as above. At point R (where the width w of the pits is 0.30 μm and the depth of the pits is λ/10), the degree of asymmetry of the tracking error signal is 0.18. This corresponds to the difference between the areas of the pattern ABC'D' (and the pattern C'D'EF shown in part (d) of FIG. 12. The degree of asymmetry is lower than that provided by the photodetector 1050 but is still sufficiently large to cause the unstable control of tracking, a significant control error (off-track), and other problems.

SUMMARY OF THE INVENTION

An optical disc apparatus capable of mounting an optical disc according to the present invention includes a light source for emitting light; an objective lens for collecting the light emitted by the light source on the optical disc; a first light distribution section integrally movable with the objective lens, the first light distribution section including a first area and a second area, the first light distribution section outputting the light reflected by the optical disc and transmitted through the first area or the second area as transmission light, outputting the light reflected by the optical disc and diffracted by the first area as first diffraction light, and outputting the light reflected by the optical disc and a diffracted by the second area as second diffraction light; a transmission light detection section for detecting the transmission light and outputting a TE1 signal indicating an offset of the detected transmission light; a first diffraction light detection section for detecting the first diffraction light and the second diffraction light, and outputting a TE2 signal indicating a difference between a light amount of the detected first diffraction light and a light amount of the detected second diffraction light; and a control device for generating a tracking error signal for the optical disc based on the TE1 signal and the TE2 signal.

In one embodiment of the invention, the optical disc apparatus further includes a second light distribution section for directing the transmission light toward the transmission light detection section, and directing the first diffraction light and the second diffraction light toward the first diffraction light detection section.

In one embodiment of the invention, the transmission light detection section includes a first sub-transmission light detection section and a second sub-transmission light detection section. First transmission light is defined as part of the transmission light, which is detected by the first sub-transmission light detection section, and second transmission light is defined as a part of the transmission light, which is detected by the second sub-transmission light detection section. The offset of the transmission light is defined as a difference between a light amount of the first transmission light and a light amount of the second transmission light.

In one embodiment of the invention, the first diffraction light detection section includes a first sub-diffraction light detection section for detecting the first diffraction light and a second sub-diffraction light detection section for detecting the second diffraction light.

In one embodiment of the invention, the control device obtains the tracking error signal by TE2−k×TE1.

In one embodiment of the invention, the transmission light detection section includes a third area and a fourth area. The first sub-transmission light detection section is provided in the third area, and the second sub-transmission light detection section is provided in the fourth area. A border between the third area and the fourth area is parallel to a rotation direction of the optical disc.

In one embodiment of the invention, the first diffraction light detection section includes a fifth area and a sixth area. The first sub-diffraction light detection section is provided in the fifth area, and the second sub-diffraction light detection section is provided in the sixth area. A border between the fifth area and the sixth area is parallel to a rotation direction of the optical disc.

In one embodiment of the invention, the control device updates a value of k in accordance with a logical product of a numerical aperture (NA) of the objective lens and a pitch (P) of the optical disc in a diameter direction of the optical disc (NA×P).

In one embodiment of the invention, a value of k is 0.5×S2/S1 or less, wherein S1 is a light amount of the transmission light detected by the transmission light detection section, and S2 is a light amount of the diffraction light detected by the first diffraction light detection section.

In one embodiment of the invention, the control device sets the value of k at zero when the logical product of the numerical aperture (NA) of the objective lens and the pit pitch (P) of the optical disc in the diameter direction of the optical disc (NA×P) is 0.9 times or more of the wavelength of the light incident on the optical disk.

In one embodiment of the invention, the control device sets a value of k so that an average output level of TE2−k× TE1 is substantially zero when the control device shifts the objective lens in a diameter direction of the optical disc without performing tracking control.

In one embodiment of the invention, the optical disc apparatus further includes an aberration section for providing the transmission light with an aberration. The tranismission light detection section includes a third area, a fourth area, a seventh area and an eighth area. The first sub-transmission light detection section is provided in the third area. The second sub-transmission light detection section is provided in the fourth area. The third sub-transmission light detection section is provided in the seventh area. The fourth sub-transmission light detection section is provided in the light area. A border between the third area and the fourth area is parallel to a rotation direction of the optical disc. A border between the third area and the eighth area is parallel to a diameter direction of the optical disc. A border between the fourth area and the seventh area is parallel to a diameter direction of the optical disc. A border between the seventh area and the eighth area is parallel to a rotation direction of the optical disc. The third area is orthogonal with respect to the seventh area. The fourth area is orthogonal with respect to the eighth area. The control device obtains a focusing error signal for the optical disc based on a difference between a sum of a light amount of the transmission light provided with the aberration and detected by the first sub-transmission light detection section and a light amount of the transmission light provided with the aberration and detected by the third sub-transmission light detection section, and a sum of a light amount of the transmission light provided with the aberration and detected by the second sub-transmission light detection section and a light amount of the transmission light provided with the aberration and detected by the fourth sub-transmission light detection section.

In one embodiment of the invention, the first light distribution section includes a ninth area and a tenth area. The first light distribution section outputs the light reflected by the optical disc and diffracted by the ninth area of the first light distribution section as third diffraction light, and outputs the light reflected by the optical disc and diffracted by the tenth area of the first light distribution section as fourth diffraction light. The first diffraction light detection section includes a first sub-diffraction light detection section, a second sub-diffraction light detection section, a third sub-diffraction light detection section: a fourth sub-diffraction light detection section, a fifth sub-diffraction light detection section, and a sixth sub-diffraction light detection section. The first diffraction light is detected by the first sub-diffraction detection section and the second sub-diffraction detection section. The second diffraction light is detected by the fifth sub-diffraction detection section and the sixth sub-diffraction detection section. The third diffraction light is detected by the fourth sub-diffraction detection section and the fifth sub-diffraction detection section. The fourth diffraction light is detected by the second sub-diffraction detection section and the third sub-diffraction detection section. The control device obtains a focusing error signal for the optical disc based on a difference between a total light amount of the diffraction light detected by the first sub-diffraction light detection section, the third sub-diffraction light detection section and the fifth sub-diffraction light detection section, and a total light amount of the diffraction light detected by the second sub-diffraction light detection section, the fourth sub-diffraction light detection section and the sixth sub-diffraction light detection section.

In one embodiment of the invention, the optical disc apparatus further includes a second diffraction light detection section. The first light distribution section outputs the light, reflected by the optical, disc and diffracted by the first area of the first light distribution section separately from the first diffraction light, as fifth diffraction light, and outputs the light, reflected by the optical disc and diffracted by the second area of the first light distribution section separately from the second diffraction light, as sixth diffraction light. The second diffraction light detection section includes a seventh sub-diffraction light detection section and an eighth sub-diffraction light detection section. The control device obtains a focusing error signal for the optical disc based on a difference between a light amount of the fifth diffraction light detected by the seventh sub-diffraction light detection section and alight amount of the sixth sub-diffraction light detected by the eighth sub-diffraction light detection section.

In one embodiment of the invention, the first light distribution section includes a holographic element having a pattern having sawtooth-lie or step-like shape including three or more steps, the pattern being continuous over sequential cycles. The first light distribution section outputs the light, reflected by the optical disc and diffracted by the first area of the first light distribution section separately from the first diffraction light, as fifth diffraction light, and outputs the light, reflected by the optical disc and diffracted by the second area of the first light distribution section separately from the second diffraction light, as sixth diffraction light. A light amount of the first diffraction light and a light amount of the fifth diffraction light both output by the first light distribution section are different from each other, and a light amount of the second diffraction light and a light amount of the sixth diffraction light both output by the first light distribution section are different from each other.

In one embodiment of the invention, the first diffraction light and the second diffraction light output by the first light distribution section are positive first order diffraction light, and the fifth diffraction light and the sixth diffraction light output by the first light distribution section are negative first order diffraction light.

In one embodiment of the invention, a light amount of the negative first order diffraction light is substantially zero.

In one embodiment of the invention, a light amount output by the first light distribution section is largest for the positive first order diffraction light, second largest for the transmission light, and smallest for the negative first order diffraction light.

In one embodiment of the invention, a light amount output by the first light distribution section is largest for the transmission light, second largest for the positive first order diffraction light, and smallest for the negative first order diffraction light.

In one embodiment of the invention, a light amount output by the first light distribution section is largest for the transmission light, second largest for the negative first order diffraction light, and smallest for the positive first order diffraction light.

In one embodiment of the invention, the optical disc apparatus further includes a second diffraction light detection section. The first light distribution section includes a ninth area and a tenth area. The first light distribution section outputs the light reflected by the optical disc and diffracted by the ninth area of the first light distribution section as third diffraction light, outputs the light reflected by the optical disc and diffracted by the tenth area of the first light distribution section as fourth diffraction light, outputs the light, reflected by the optical disc and diffracted by the first area of the first light distribution section separately from the first diffraction light, as fifth diffraction light, and outputs the light, reflected by the optical disc and diffracted by the second area of the first light distribution section separately from the second diffraction light, as sixth diffraction light. The second diffraction light detection section includes an eleventh area, a twelfth area, a thirteenth area, a fourteenth area, a fifteenth area, and a sixteenth area. A seventh sub-diffraction light detection section is provided in the eleventh area. An eighth sub-diffraction light detection section i s provided in the twelfth area. A ninth sub-diffraction light detection section is provided in the thirteenth area. A tenth sub-diffraction light detection section is provided in the fourteenth area. An eleventh subsidization light detection section is provided in the fifteenth Area. A twelfth sub-diffraction light detect Ion sect Ion is provided in the sixteenth area. The third diffraction light lo detected by the seventh sub-diffraction light detection section and the eighth sub-diffraction light detection section. The fourth diffraction light is detected by the is eleventh sub-diffraction light detection section and the twelfth sub-diffraction light detection section. The fifth diffraction light is detected by the tenth sub-diffraction light detection section and the eleventh sub-diffraction light detection section. The sixth diffraction light is detected by the eighth sub-diffraction light detection section and the ninth sub-diffraction light detection section. The control device obtains a focusing error signal for the optical disc based on a difference between a total light amount of the diffraction light detected by the seventh sub-diffraction light detection section, the ninth sub-diffraction light detection section and the eleventh sub-diffraction light detection section, and a total light amount of the sub-diffraction light detected by the eighth sub-diffraction light detection section, the tenth sub-diffraction light detection section and the twelfth sub-diffraction light detection section.

In one embodiment of the invention, the optical disc apparatus further includes a second diffraction light detection section. The first light distribution section includes a ninth area and a tenth area. The first light distribution section outputs the light reflected by the optical disc and diffracted by the ninth area of the first light distribution section as third diffraction light, outputs the light reflected by the optical disc and diffracted by the tenth area of the first light distribution section as fourth diffraction light, outputs the light, reflected by the optical disc and diffracted by the first area of the first light distribution section separately from the first diffraction light, as fifth diffraction light, and outputs the light, reflected by the optical disc and diffracted by the second area of the first light distribution section separately from the second diffraction light, as sixth diffraction light. The second diffraction light detection section includes an eleventh area, a twelfth area, a thirteenth area, a fourteenth area, a fifteenth area, and a sixteenth area. A seventh sub-diffraction light detection section is provided in the eleventh area. An eighth sub-diffraction light detection section is provided in the twelfth area. A ninth sub-diffraction light detection section is provided in the thirteenth area. A tenth sub-diffraction light detection section is provided in the fourteenth area. An eleventh tenth sub-diffraction light detection section is provided in the fifteenth area. A twelfth sub-diffraction light detection section is provided in the sixteenth area. The third diffraction light is detected by the seventh sub-diffraction light detection section and the eighth sub-diffraction light detection section. The fourth diffraction light is detected by the eighth sub-diffraction light detection section and the ninth sub-diffraction light detection section. The fifth diffraction light is detected by the tenth sub-diffraction light detection section and the eleventh sub-diffraction light detection section. The sixth diffraction light is detected by the eleventh sub-diffraction light detection section and the twelfth sub-diffraction light detection section. The control device obtains a focusing error signal for the optical disc based on a difference between a total light amount of the diffraction light detected by the seventh sub-diffraction light detection section, the ninth sub-diffraction light detection section and the eleventh sub-diffraction light detection section, and a total light amount of the sub-diffraction light detected by the eighth sub-diffraction light detection section, the tenth sub-diffraction light detection section, and the twelfth sub-diffraction light detection section.

Thus, the invention described herein makes possible the advantages of providing an optical disc apparatus for sufficiently decreasing the degree of asymmetry of a tracking error signal caused by the shift of the central axis of an objective lens with respect to the optical axis of the optical disc apparatus and suppressing off-track, so as to realize satisfactory and stable recording and reproduction.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

An optical disc apparatus 100 according to a first example of the present invention will be described with reference to FIGS. 1A through 1C, 2, 3, 13A, 13B and 14.

Figure 1A:
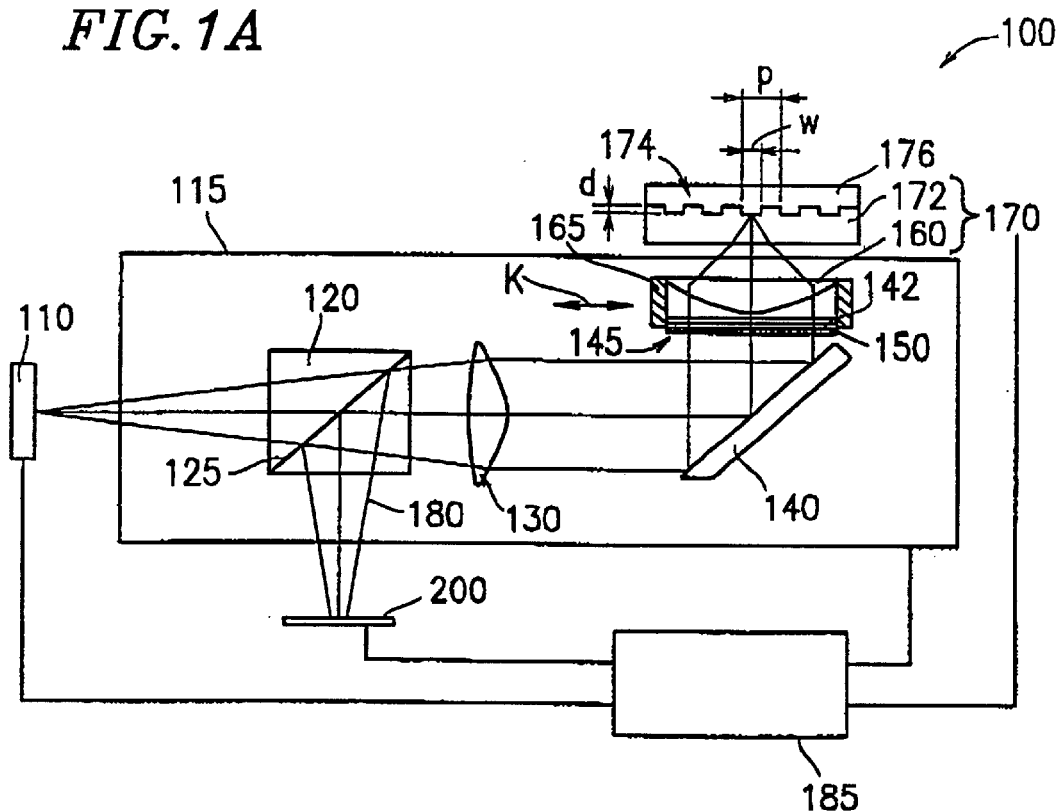
FIG. 1A is a schematic view of an optical disc apparatus according to a first example of the present invention.

FIG. 1A shows the optical disc apparatus 100. Laser light emitted by a laser light source 110 is converged on an optical disc 170 through an optical system 115. The light reflected by the optical disc 170 is detected by a photodetector 200. Based on a result detected by the photodetector 200, a control device 185 controls an element or elements among the light source 110, the optical system 115, and the optical disc 170 as necessary. The optical system 115 includes, for example, a polarizing beam slitted 120 having a splitting face 125, a collimator lens 130, a quarter-wave plate 142, a reflecting mirror 140, a polarizing holographic element 145, and an objective lens 160.

A more specific operation of the optical disc apparatus 100 will be described.

Laser light emitted by the light source 110 is incident on the polarizing beam splitter 120 and transmitted through the splitting face 125 of the polarizing beam splatter 120, and then converted into parallel light by the collimator lens 130. The light source 110 is, for example, a semiconductor laser. The parallel light is reflected by the reflecting mirror 140 and incident on the polarizing holographic element 145.

The polarizing holographic element 145 is integrated into a lens holder 165 together with the objective lens 160. The polarizing holographic element 145 has the quarter-wave plate 142. A surface of the polarizing holographic element 145 is a polarizing holographic face 150.

The light (P wave), which in incident on the polarizing holographic element 145, is transmitted through the polarizing holographic face 150 and converted into circular polarization by the quarterwave plate 142, collected by the objective lens 160, and then converged on a signal face 174 of the optical disc 170.

The optical disc 170 has the signal face 174 between a substrate 172 and a protection film 176. The signal face 174 has pits (or grooves) formed in a rotation direction of the optical disc 170. The pits each have a depth d and a width w, and arranged at a pitch p.

The light reflected by the signal face 174, which is circularly polarized, to transmitted through the objective lens 160, converted into linear polarization (S wave) by the quarter-wave plate 142, and then diffracted by or transmitted through the polarizing holographic face 150. In this specification, 0th order diffraction is defined to be transmission. Then, the light is reflected by the reflecting mirror 140, made convergent by the collimator lens 130, reflected by the splitting face 125 of the polarizing beam splitter 120, and then collected on the photodetector 200 as light 180. Based on a signal detected by the photodetector 200, the control device 185 controls an element or elements among the light source 110, the optical system 115, and the optical disc 170 as necessary. The photodetector 200 detects, for example, a focusing error signal or a tracking error signal for the optical disc 170.

In this specification, a holographic element acts as a first light distribution section, and a polarizing beam splitter acts as a second light distribution section.

Figure 1B:
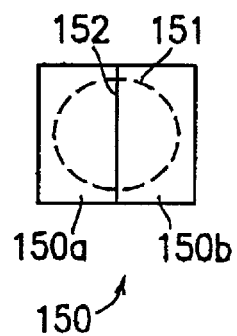
FIG. 1B shows a structure of a polarizing holographic face in the optical disc apparatus of the first example.

FIG. 1B shows a structure of the polarizing holographic face 150. The polarizing holographic face 150 includes two areas 150a and 150b which are separated from each other by a separation line 152. The areas 150a and 150b have different holographic patterns. The separation line 152 is parallel to a rotation direction of the optical disc 170. The light reflected by the optical disc 170 (i.e., a light beam 151) is substantially equally divided into two by the separation line 152. The transmission light (0th order light) or diffraction light (for example, 1st order light) passing through the polarizing holographic face 150 is reflected by the reflecting mirror 140 and made convergent by the collimator lens 130. Then, the light is reflected by the splitting face 125 of the polarizing beam splitter 120 and collected on the photodetector 200 as the light 180.

Figure 1C:
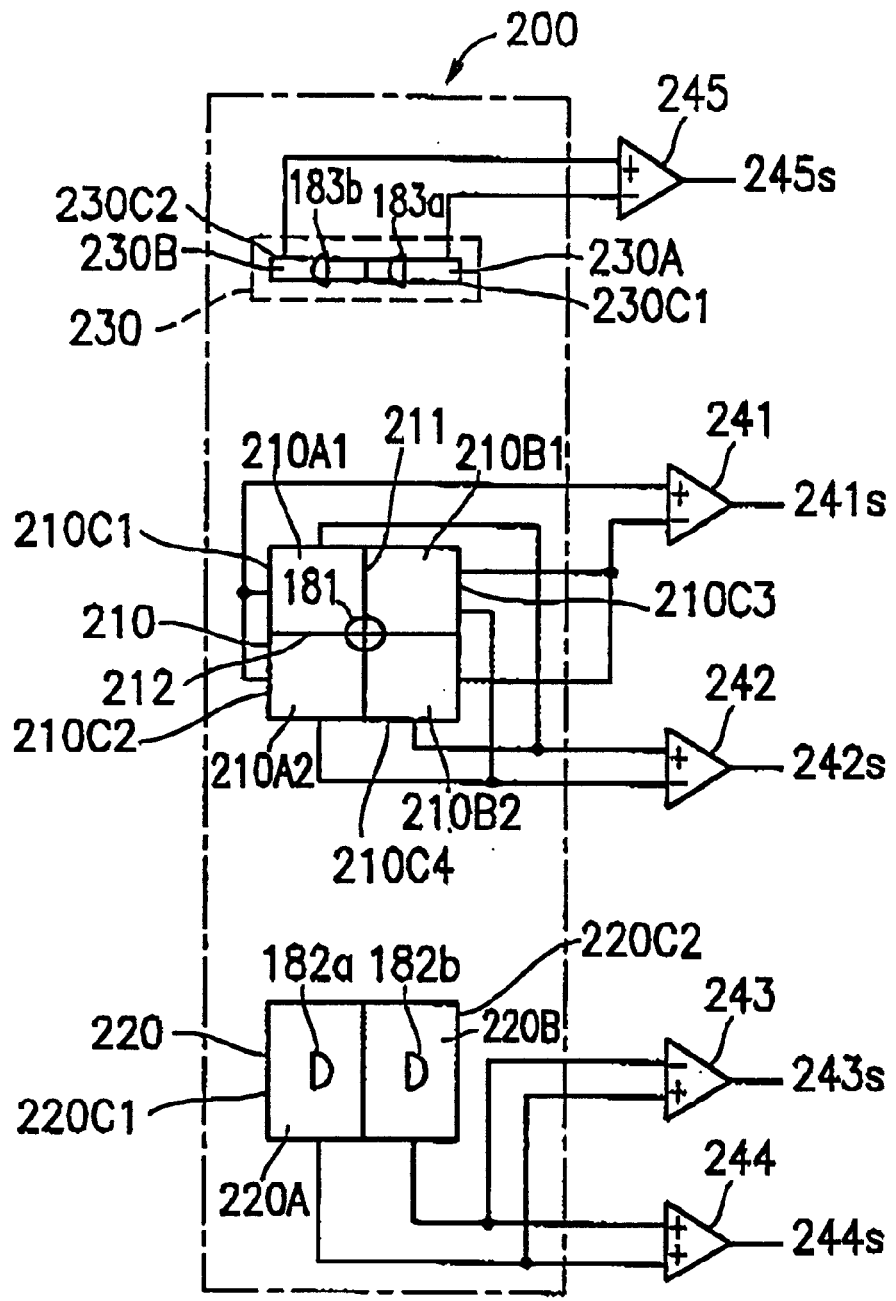
FIG. 1C shows a structure of a photodetector in the optical disc apparatus of the first example.

FIG. 1C shows a structure of the photodetector 200. The photodetector 200 includes a transmission light detector 210 for detecting transmission light, and a first diffraction light detector 220 and a second diffraction light detector 230 both for detecting diffraction light. The transmission light detector 210 is provided in a central area of the photodetector 200. The first diffraction light detector 220 and the second diffraction light detector 230 are provided in a first outer area and a second outer area, respectively, of the photodetector 200 so as to interpose the transmission light detector 210 therebetween.

The transmission light detector 210 includes four sub-transmission light detectors 210A1, 210A2, 210B1 and 210B2. The transmission light detector 210 includes four areas 210C1, 210C2, 210C3 and 210C4. The sub-transmission light detector 210A1 is provided in the area 210C1. The sub-transmission light detector 210A2 is provided in the area 210C2. The sub-transmission light detector 210B1 lo provided in the area 210C3. The sub-transmission light detector 210B2 is provided in the area 210C4. The areas 210C1, 210C2, 210C3 and 210C4 are separated from each other by separation lines 211 and 212 which are perpendicular to each other. The separation line 211 extends parallel to the rotation direction of the optical disc 170.

The first diffraction light detector 220 provided in the first outer area includes two sub-diffraction light detectors 220A and 220B. The first diffraction light detector 220 includes areas 220C1 and 220C2. The sub-diffraction light detector 220A is provided in the area 220C1 The sub-diffraction light detector 220B is provided in the area 220C2.

The second diffraction light detector 230 provided in the second outer area includes two sub-diffraction light detectors 230A and 230B. The second diffraction light detector 230 includes areas 230C1 and 230C2. The sub-diffraction light detector 230A is provided in the area 230C1. The sub-diffraction light detector 230B is provided in the area 230C2.

Positive first order diffraction light diffracted by the area 150a of the polarizing holographic face 150 is collected on the sub-diffraction light detector 220A as a spot 182a. Negative first order diffraction light diffracted by the area 150a of the polarizing holographic face 150 (FIG. 1B) is focused after the sub-diffraction light detector 230A and collected on the sub-diffraction light detector 230A as a spot 183a.

Positive first order diffraction light diffracted by the area 150b of the polarizing holographic face 150 (FIG. 1B) is collected on the sub-diffraction light detector 220B as a spot 182b. Negative first order diffraction light diffracted by the area 150b of the polarizing holographic face 150 is focused before the sub-diffraction light detector 230B and collected on the sub-diffraction light detector 230B as a spot 183b. The light transmitted through the polarizing holographic face 150 (0th order light or transmission light) is collected substantially at an intersection of the separation lines 211 and 212 of the transmission light detector 210 (in a central area of the transmission light detector 210) as a spot 181. This light is focused after the detection face of the transmission light detector 210.

The sub-diffraction light detectors 220A and 220B of the first diffraction light detector 220 each detect a light amount. A second tracking error signal 2435 (TE2 signal) is obtained by subjecting the detected light amounts to a subtraction performed by a subtracter 243. A reproduction signal 244s is obtained by subjecting the detected light amounts to addition performed by an adder 244. The TE2 signal corresponds to the TE2 signal detected by the photodetector 1190 shown in FIG. 1C.

Figure 10A:
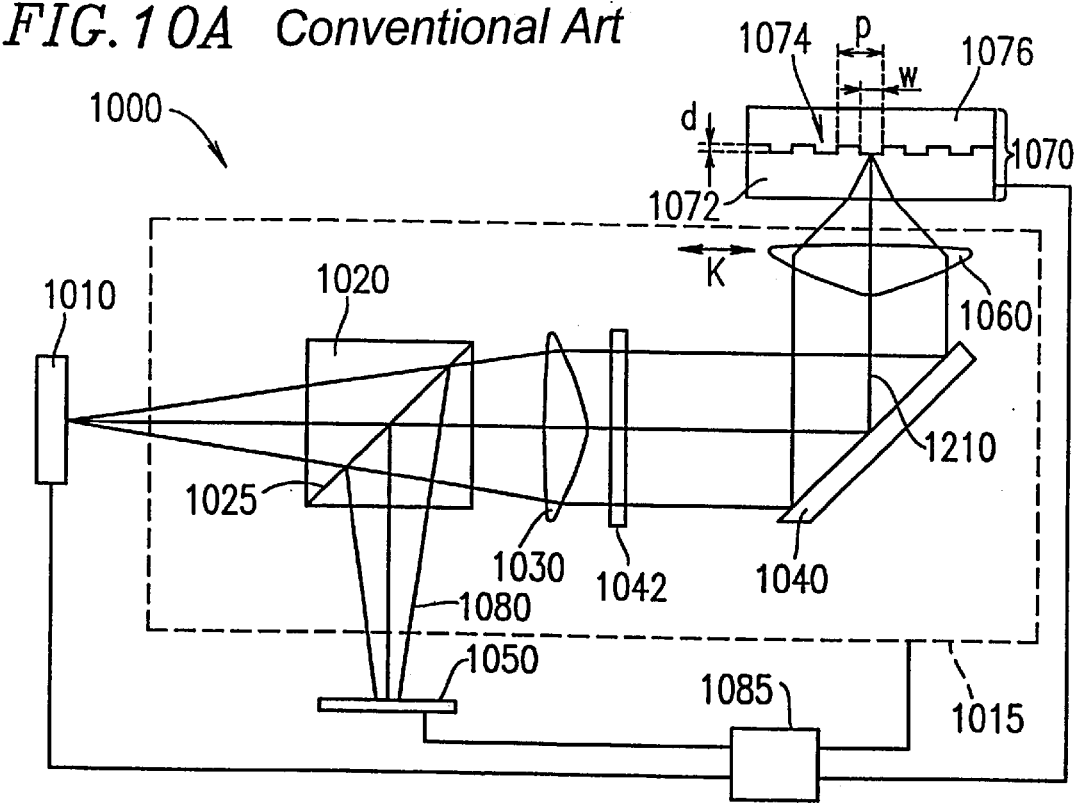
FIG. 10A is a schematic view of a first conventional optical disc apparatus.
Figure 10B:
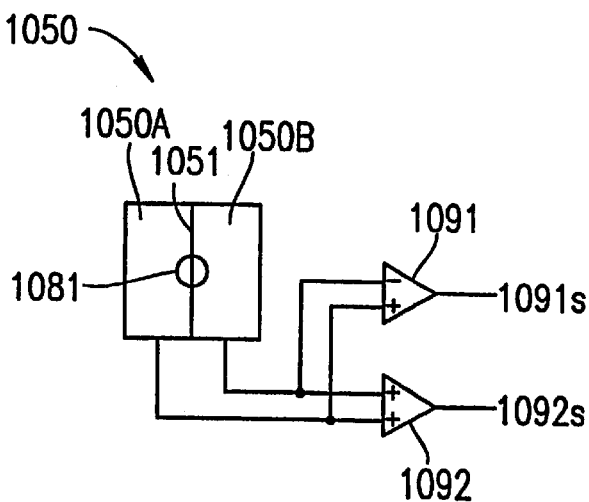
FIG. 10B shows a structure of a photodetector in the first conventional optical disc apparatus.

Based on detection results of the sub-transmission light detectors 210A1, 210A2, 210B1 and 210B2, a calculator 241 of the photodetector 200 outputs 210A1+210A2−210B1−210B2. The output from the calculator 241 is a first tracking error signal 241s (TE1 signal). The TE1 signal corresponds to the TE1 signal detected by the photodetector 1050 shown in FIG. 10B. Also based on detection results of the sub-transmission light detectors 210A1, 210A2, 210B1 and 210B2, a calculator 242 of the photodetector 200 outputs 210A1+210B2−210A2−210B1. The output from the calculator 242 is a third tracking error signal 242s (TE3 signal). The TE3 signal is generally referred to as a phase differential TE (tracking error) signal.

In this example, the transmission light detector 210, which is substantially rectangular, is divided into sub-transmission light detectors 210A1, 210A2, 210B1 and 210B2, which are also substantially rectangular, in this cases the difference between the light amount detected by two sub-transmission light detectors adjacent in a direction parallel to the rotation direction of the optical disc 170 (210A1 and 210A2) and the light amount detected by the other two sub-transmission light detectors (210B1 and 210B2) is the TE1 signal. The difference between the light amount detected by two sub-transmission light detectors orthogonally provided (210A1 and 210B2) and the light amount detected by the other two sub-transmission light detectors (210A2 and 210B1) is the TE3 signal.

The sub-diffraction light detectors 230A and 230B of the second diffraction light detector 230 each detect a light amount. A focusing error signal 245s (FE signal) is obtained by subjecting the detected light amounts to subtraction performed by a subtracter 245.

The control device 185 generates a tracking error signal for the optical disc 170 based on the TE1 and TE2 signals.

In this example, three types of tracking error signals (TE1, TE2 and TE3 signals) are obtained. These tracking error signals can be used in accordance with the type of the optical disc. For example, in the case of an optical disc having a pit depth corresponding to about ¼ of the wavelength (e.g., DVD-ROM disc), the control device 185 can use a TE3 signal as a tracking error signal with respect to a pit signal (emboss signal).

In the case of an optical disc having a guide groove such as for example, a DVD-RAM disc or DVD-R disc, the control device 185 can use a calculation result value of TE2−k×TE1, obtained by using an appropriate constant k, as a tracking error signal, in this case, the control device 185 can update the value of k in accordance with the type of the optical disc.

Figure 11A:
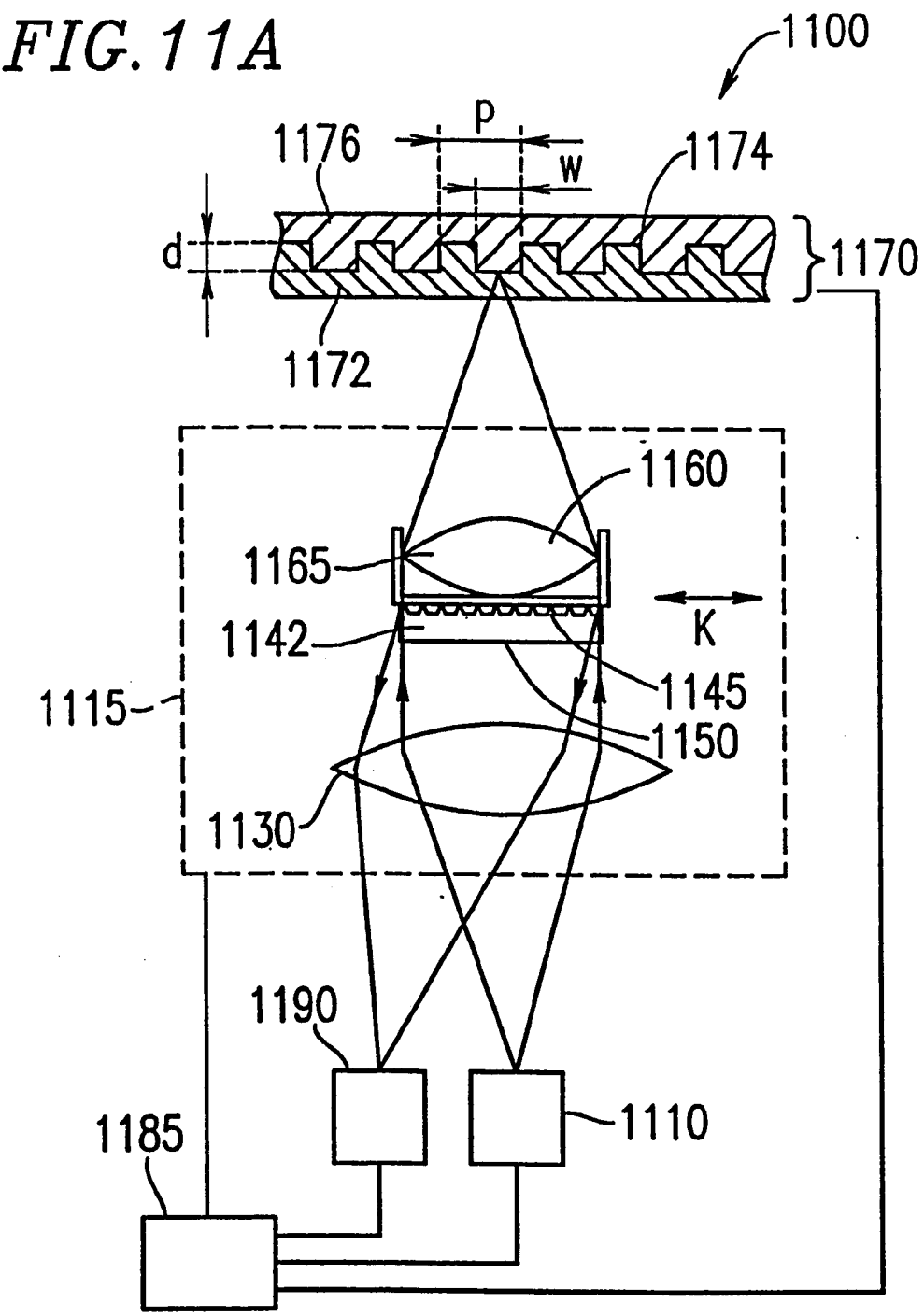
FIG. 11A is a schematic view of a second conventional optical disc apparatus.
Figure 11B:
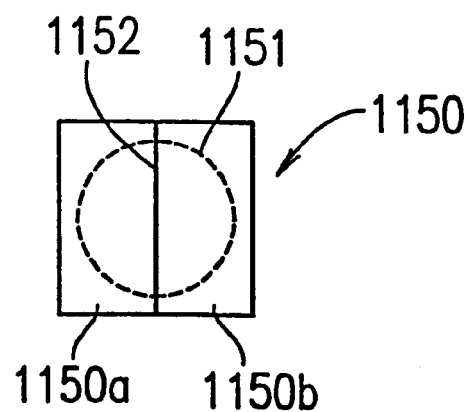
FIG. 11B shows a structure of a polarizing holographic face in the second conventional optical disc apparatus.
Figure 11C:
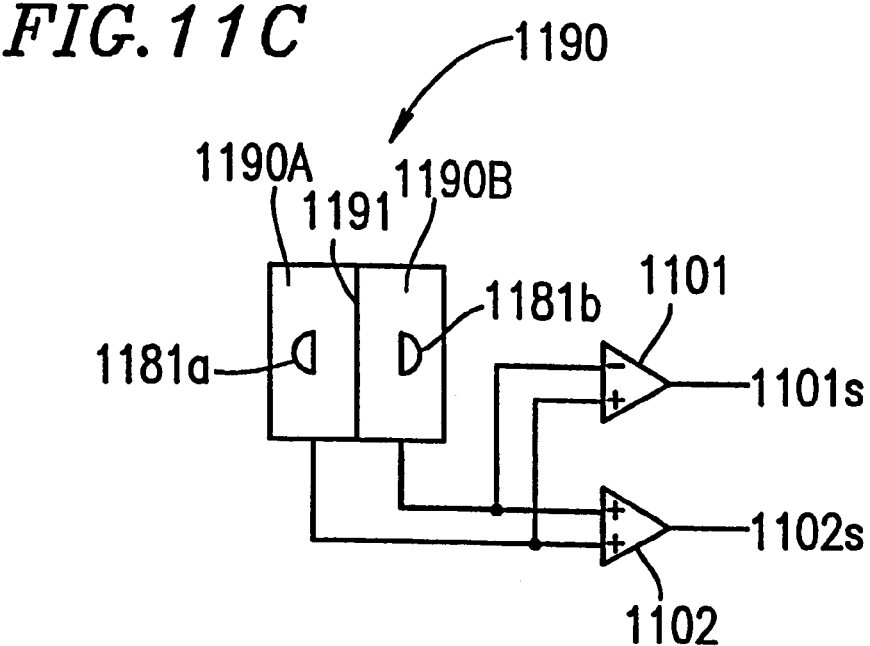
FIG. 11C shows a structure of a photodetector in the second conventional optical disc apparatus.
Figure 13A:
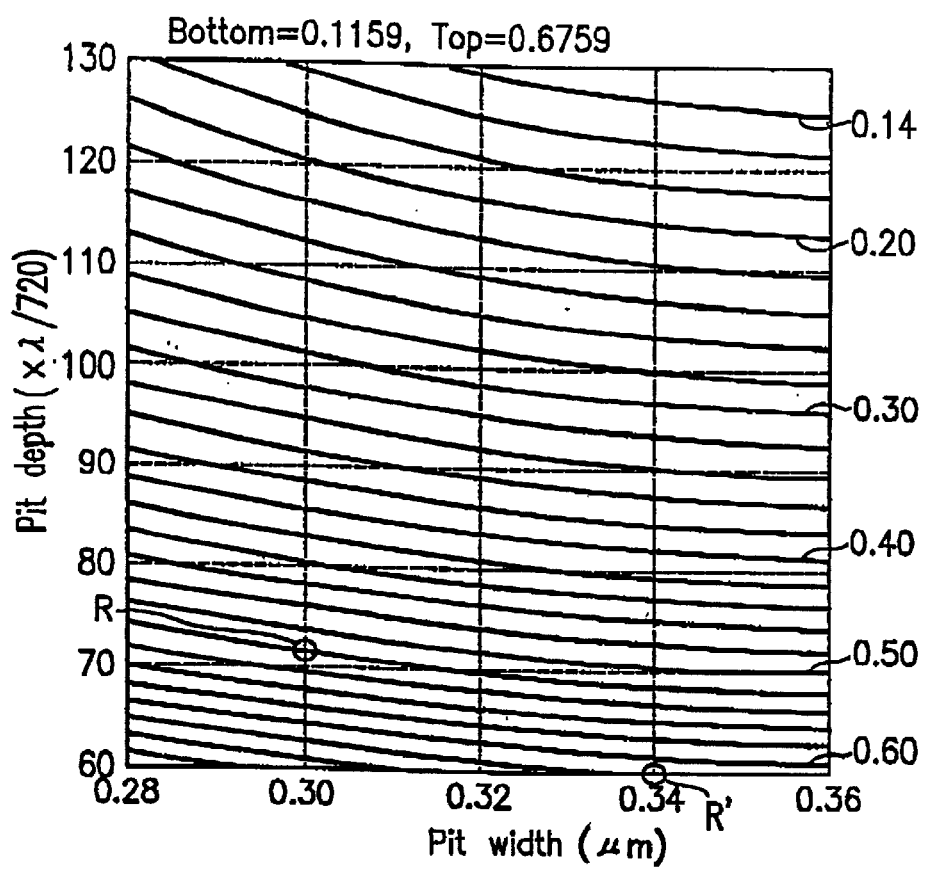
FIG. 13A it a contour diagram illustrating the degree of asymmetry of a TE1 signal in the first conventional optical disc apparatus (pit pitch p=0.74 $\mu$m)
Figure 13B:
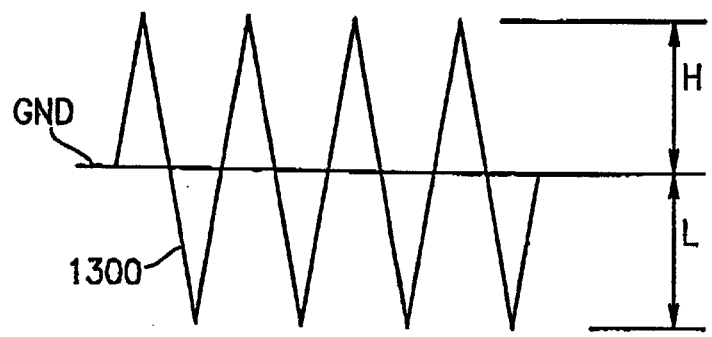
FIG. 13B is a signal waveform diagram illustrating asymmetry of a signal.
Figure 14:
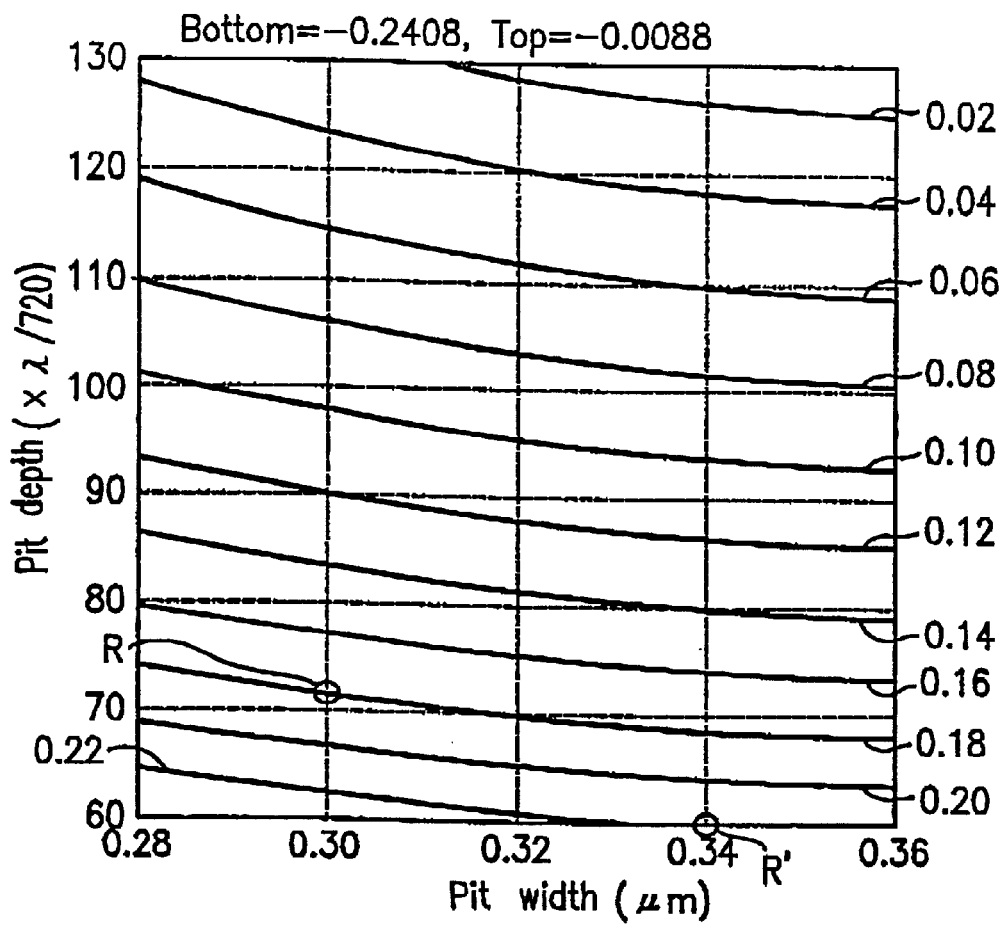
FIG. 14 is a contour diagram illustrating the degree of asymmetry of a TE2 signal in the second conventional optical disc apparatus (pit pitch p=0.74 µm).

For example, in the case where the optical disc 170 has a pit pitch of 0.74 µm, the TE1 signal shows asymmetry as shown in FIG. 13A for the reason described regarding the photodetector 1050 (FIG. 10B) when the objective lens 160 is shifted in the direction of arrow K (FIG. 1A). The TE2 signal also shows the asymmetry as shown in FIG. 14 for the reason described regarding the photodetector 1190 (FIG. 11C). Accordingly, where the shifting amount of the objective lens 160 is X, the level of a true tracking error signal (tracking error signal with no influence of the shifting of the objective lens 160) is TE, the total light amount received by the transmission light detector 210 is S1, and the total light amount received by the first diffraction light detector 220 is S2, the following expressions can be provided.

$$TE1/S1 = TE + X \qquad \text{expression 1}$$

$$TE2/S2 = TE + m \times X \qquad \text{expression 2}$$

At point R (where the width w of the pits is 0.30 µm and the depth of the pits is λ/10), coefficient m=0.18/0.52=1/2.89. At point R' (where the width w of the pits is 0.34 µm and the depth of the pits is λ/12), coefficient m=0.22/0.62=1/2.82. At points other than point R, m is in the vicinity of 1/2.89 (see FIGS. 13A and 14).

From expressions 1 and 2, expression 3 is obtained.

$$TE = (TE2 - k \times TE1)/S2(1-m) \qquad \text{expression 3}$$

where k is given by expression 4.

$$k = m \times S2/S1 \qquad \text{expression 4}$$

When the pit pitch P of the optical disc 170 is 0.74 µm, a tracking error signal with no influence of the shifting of the objective lens 160 is obtained by using, as the tracking error signal, the calculation result of TE2−k×TE1 with k fulfilling expression 4. In this manner, the degree of asymmetry of the tracking error signal caused by the shifting of the objective lens 160 can be suppressed.

Figure 2:
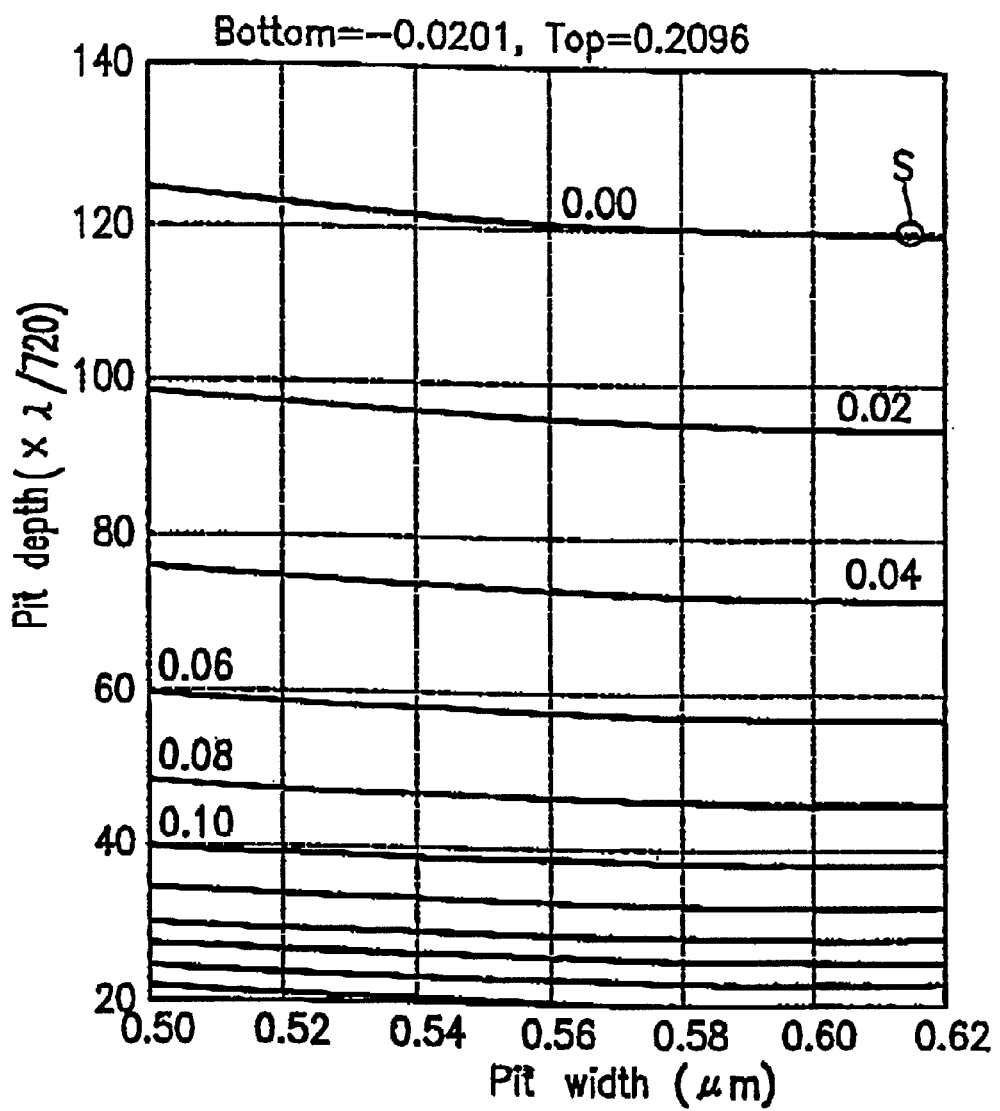
FIG. 2 is a contour diagram illustrating the degree of asymmetry of a TE2 signal in the optical disc apparatus of the first example when laser light crosses pits of an optical disc (pit pitch p=1.23 $\mu$m)
Figure 12:
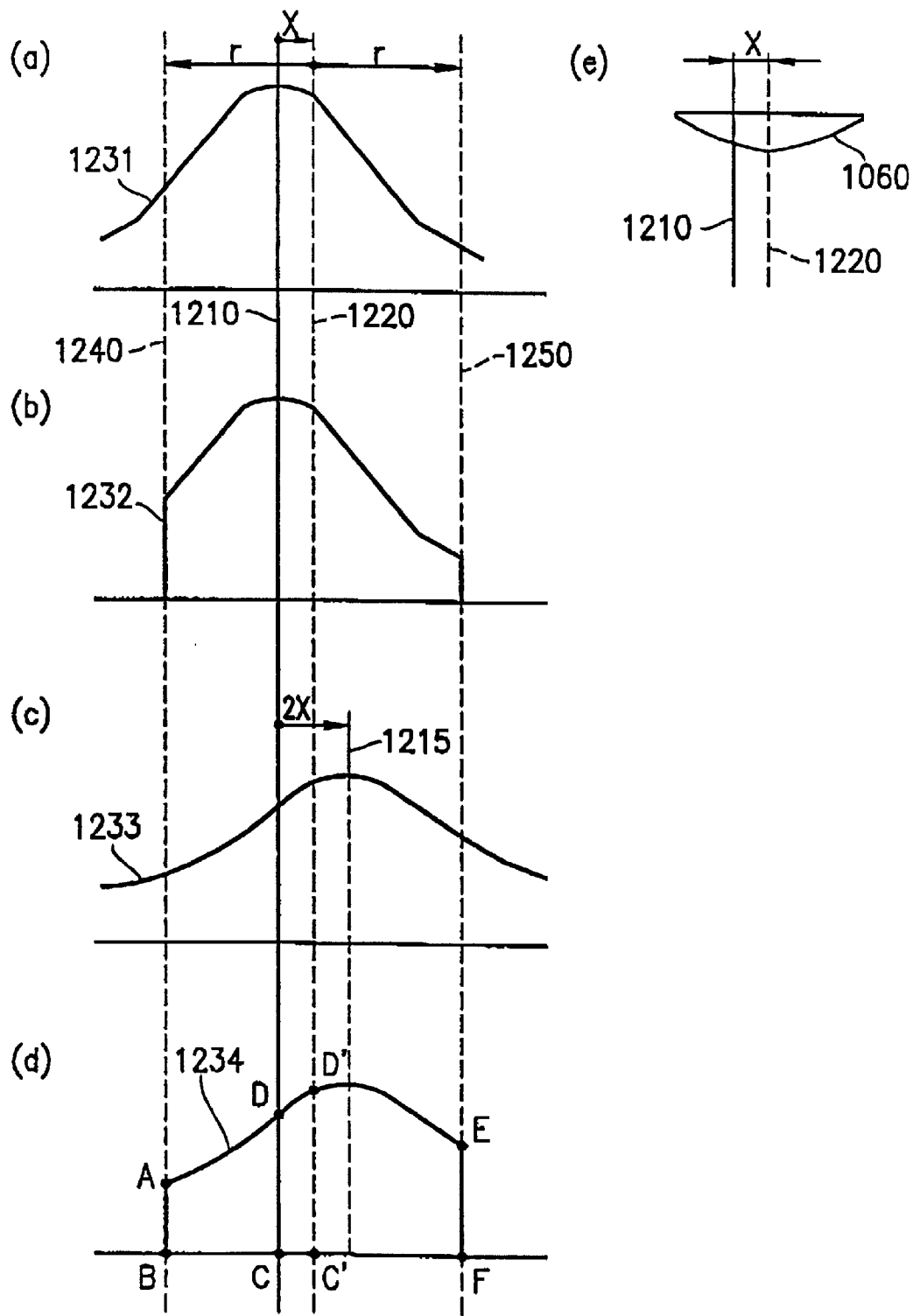
FIG. 12 show light intensity distributions in a cross-section along a diameter direction of an optical disc when a central axle of an objective lens is shifted with respect to an optical axis of the optical disc apparatus.

FIG. 2 is a graph illustrating the degree of asymmetry of the waveform of the TE2 signal when the laser light crosses the pit a (when tracking is off). The optical disc has a pit pitch of 1.23 µm. The degree of asymmetry is represented as contours. The other conditions are the same as those of FIG. 13A. At point S (the width w of the pits is 0.615 µm and the depth of the pits is λ/12), the degree of asymmetry of the TE2 signal is 0.00. Even at points shifted from point S in the pit depth and pit width, the degree of asymmetry of the TE2 signal is almost zero. This is because when the pit pitch p=1.23 µm, the light intensity distributions 1233 (part (c) of FIG. 12) and 1234 (part (d) of FIG. 12) are almost uniform, and thus the patterns ABC'D' and C'D'EF have almost equal areas to each other.

Accordingly, in the case where the pit pitch of the optical disc is 1.23 µm, when the control device 185 sets k=0 the calculated level of the TE signal (TE2−k×TE1) is equal to that of the TE2 signal. The TE signal is not influenced by the shifting of the objective lens and the degree of asymmetry of the TE signal is sufficiently suppressed.

Therefore, in the case where the optical disc 170 has a relatively large pit pitch, such as a DVD-RAM disc or the like, the control device 185 sets k=0. In the case where the optical disc 170 has a relatively small pit pitch as a DVD-R disc, a DVD-RW disc or the like, the control device 185 sets k=m×S2/S1. The value of m is a constant value in the range of, for example, ½ to ⅕. The optimum value of m can be determined in accordance with the pit pitch of the optical disc 170, the numerical aperture (NA) of the objective lens 160, the ratio of the rim intensity of the light incident on the objective lens 160 (i.e., the ratio of the light intensity at the rim of the objective lens 160 with respect to the peak light intensity) or the like. The update of the constant k performed by the control device 185 can be determined in accordance with whether or not the logical product of the numerical aperture (NA) of the objective lens 160 and the pit pitch (P) of the optical disc 170 in the diameter direction thereof (NA×P) is larger than a prescribed value (for example, 0.9 times the wavelength).

By switching the value of k as described above, the degree of asymmetry of the TE signal caused by the shifting of the objective lens 160 is sufficiently suppressed even when a different type of optical disc is mounted. Off-track while the tracking control is performed can be solved. The update of the value of k can be performed a plurality of times in accordance with the pitch of the optical disc, instead of once as in the above-described example. The optimum value of k can be determined by learning. In this case, the control device 185 can set the value of constant k so that the average output level of the calculated signal TE2−k×TE1 (average value of the maximum value and the minimum value of the calculated signal) obtained when the objective lens 160 is shifted in the diameter direction of the optical disc 170 without tracking control is almost zero (ground level).

Figure 3:
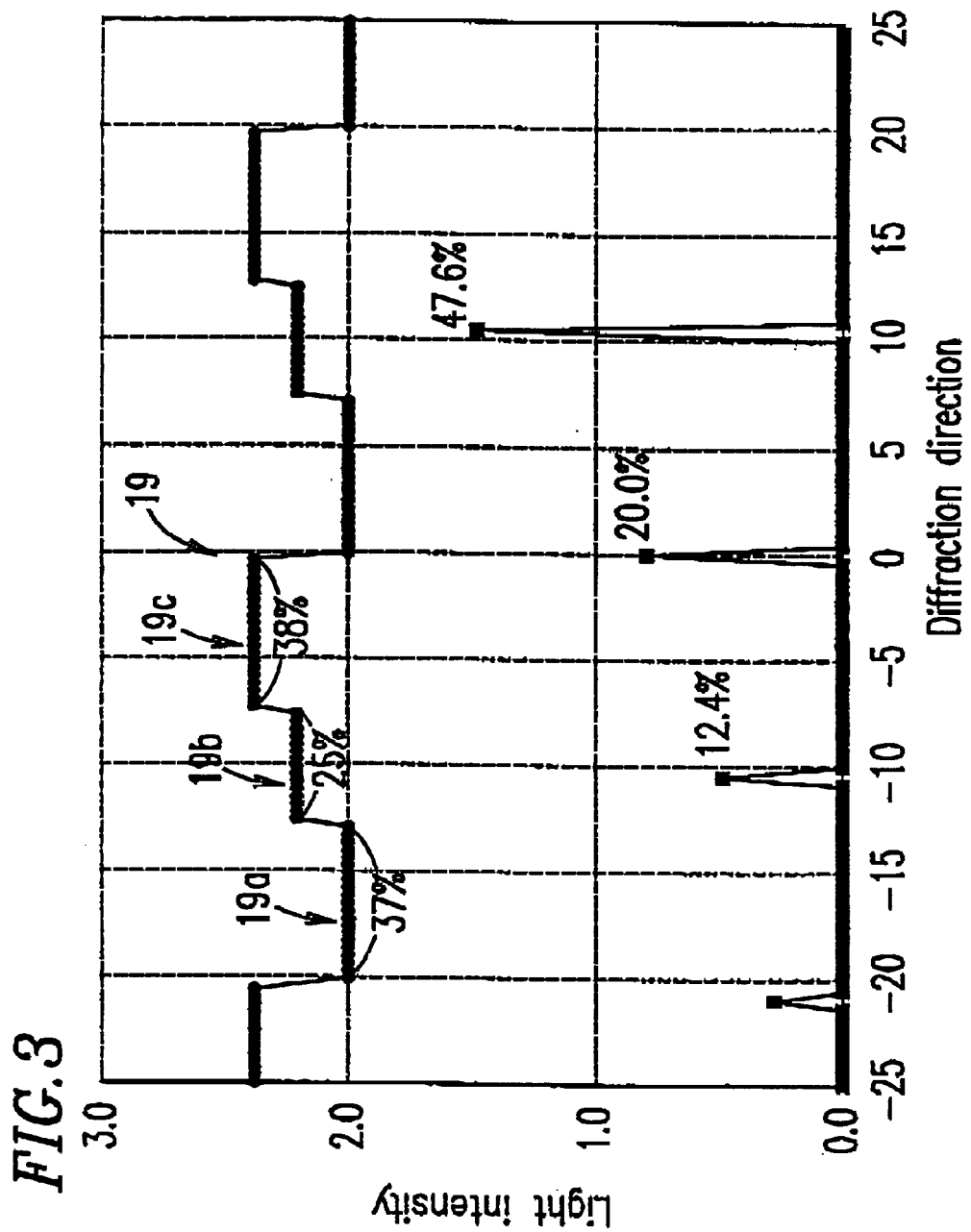
FIG. 3 is a graph illustrating the diffraction light amount ratios of a polarizing holographic element in the optical disc apparatus of the first example.

FIG. 3 is a graph illustrating the diffraction light amount ratio of the polarizing holographic element 145. The polarizing holographic face 150 of the polarizing holographic element 145 does not substantially diffract the light propagating toward the optical disc 170 (P wave) but diffracts the light propagating from the optical disc 170 (S wave). FIG. 3 also shows a phase distribution 19 of the wave surface of the light immediately after being transmitted through the polarizing holographic face 150. The phase distribution 19, or the holographic pattern, has a sawtooth-like or step-like shape, the pattern being continuous over sequential cycles. A first step 19a, a second step 19b and a third step 19c, each of which corresponds to one cycle of phase, have width ratios of 37%, 25% and 38%, respectively. A phase difference between the first step 19a and the second step 19b and the phase difference between the second step 19b and the third step 19a are each 75 degrees.

Due to such a cyclic step-like phase distribution 19, diffraction light is generated. Where the total of the transmission light and the diffraction light is 100% the ratio of the 0th order light amount (transmission light amount) is 20%, the ratio for the positive first order diffraction light amount is 47.6%, and the ratio for the negative first order diffraction light amount is 12.4%. The rest is allocated to higher order diffraction light The optical disc apparatus 100 in the first example generates a reproduction signal using positive first order diffraction light 182a and 182b (FIG. 1C) detected by the sub-diffraction light detectors 220A and 220B. Accordingly, when the ratio of the positive first diffraction light amount is higher as shown in FIG. 3, a signal having a relatively high S/N ratio can be generated. Generally, the S/N ratio is in proportion to the detection index (detected light amount/√(number of sub detectors for detecting the light)). In this example, the detection index=47.6/√2=34. The phase differential TE signal (TE3 signal) with respect to the pit signal (emboss signal) generally requires high frequency signal processing, but does not involve any problem in terms of the S/N ratio since the ratio of the 0th order light is about 20%.

In the optical disc apparatus 100 in the first example, the light source 110 and the photodetector 200 are separately provided, unlike in the conventional optical disc apparatus 1100. Therefore, the transmission light can be used in order to obtain a tracking error signal. The optical apparatus 100 in the first example, includes the polarizing beam aplitter 120, but those stilled in the art would readily conceive various structures without the polarizing beam splitter 120.

In the optical disc apparatus 100 in the first example, the light emitted by the light source 110 is diffracted after being reflected by the optical disc 170. Therefore, the light can be efficiently incident on the optical disc apparatus 200.

In the above description, ±1st order diffraction light is used as the diffraction light. Higher order diffraction light (e.g., ±2nd or 3rd order diffraction light) can be used. The spot 181 can be focused before the detection face of the transmission light detector 210. In this case, the light distribution is inverted with respect to the optical axis, and thus the polarity of the TE1 signal is changed. This can be handled by changing "TE1" in the above description into "−TE1". The same effect as described is provided.

EXAMPLE 2

Figure 4A:
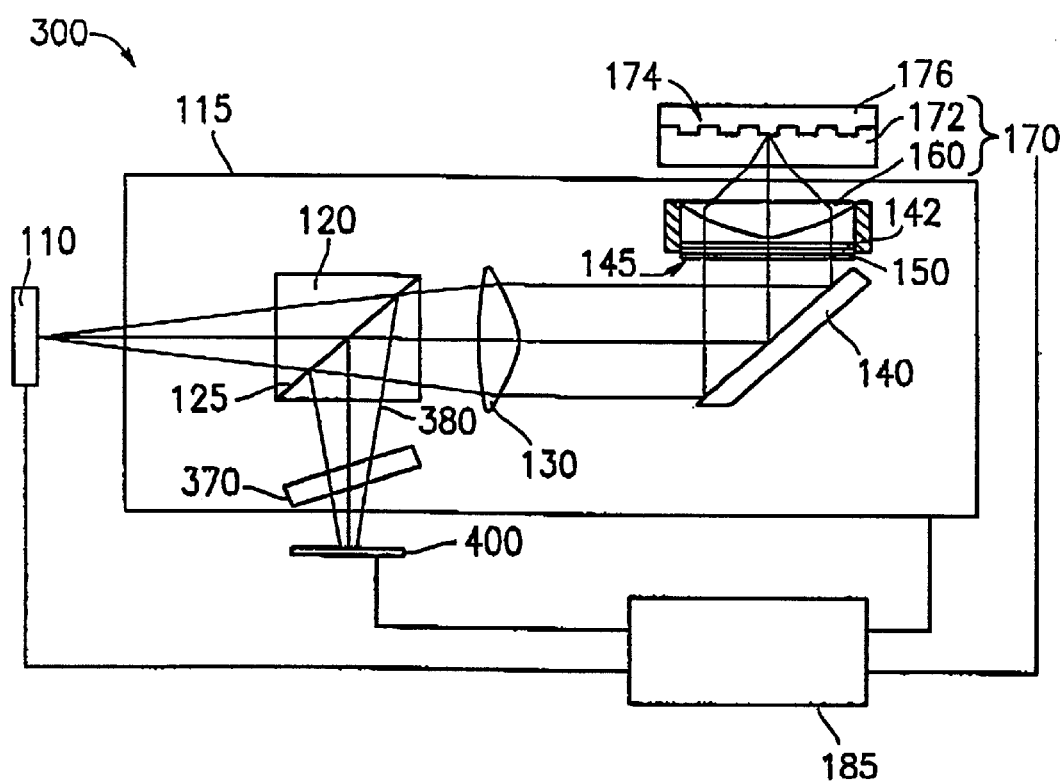
FIG. 4A is a schematic view of an optical disc apparatus according to a second example of the present invention.

FIG. 4A schematically shows an optical disc apparatus 300 according to a second example of the present invention. The optical disc apparatus 300 has the same structure as that of the optical disc apparatus 100 in the first example except that a parallel flat plate 370 is provided between the polarizing beam splitter 120 and a photodetector 400 and that the photodetector 400 had a different structure from that of the photodetector 200. Identical elements, to those of the first example will bear identical reference numeral and will not be described in detail. The parallel flat plate 370 is provided inclined with respected to an optical axis of converged light 380 incident on the parallel flat plate 370. By this inclination, the light passing through the parallel flat plate 370 is provided with aberration (astigmatism) by which focal lines extending in ±45 degree directions with respect to a separation line 411 (FIG. 4B) appears on a detection face of the photodetector 400. The parallel flat plate 370 acts as an aberration section.

Figure 4B:
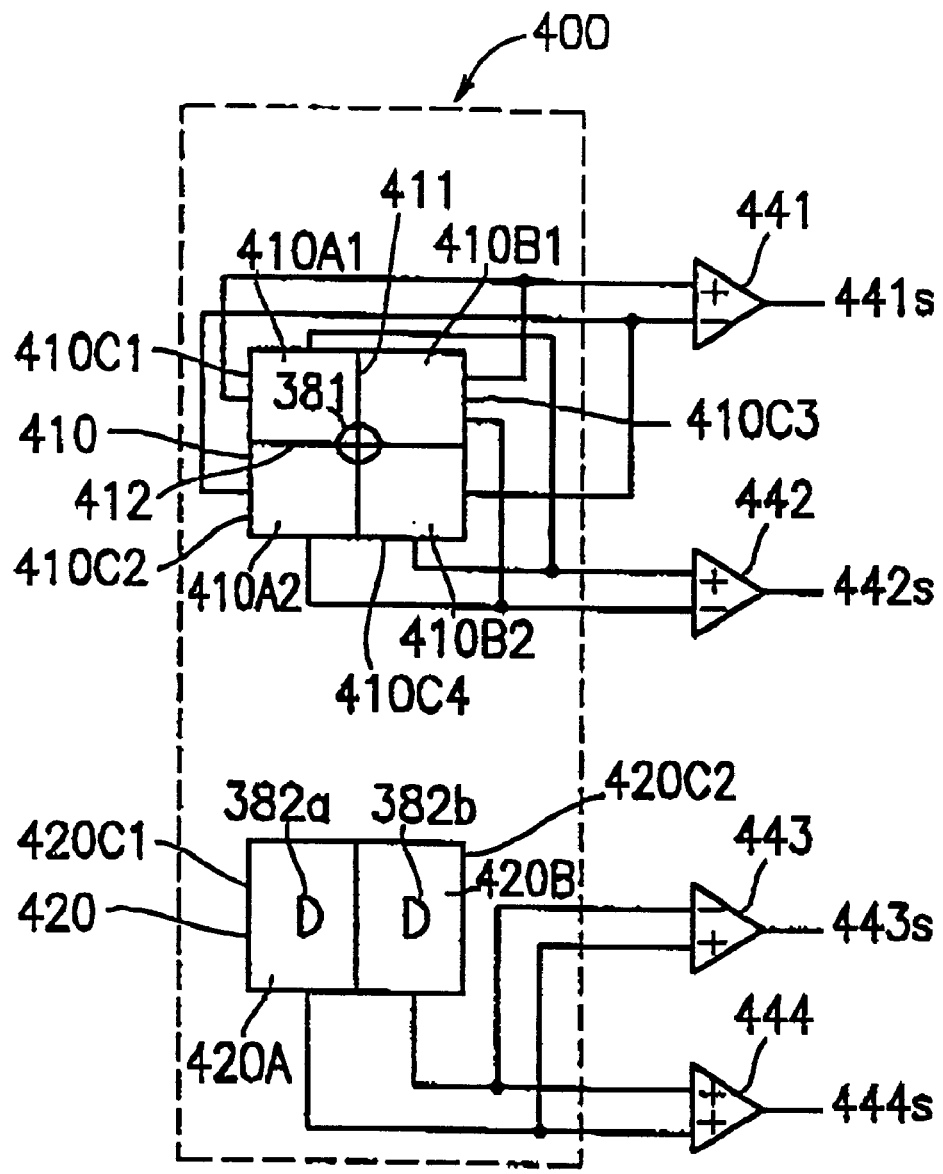
FIG. 4B shows a structure of a photodetector in the optical disc apparatus of the second example.

FIG. 4B shows the photodetector 400. The photodetector 400 includes a transmission light detector 410 and a diffraction light detector 420.

The transmission light detector 410 includes four sub-transmission light detectors 410A1, 410A2, 410B1 and 410B2. The transmission light detector 410 includes four areas 410C1, 410C2, 410C3 and 410C4. The sub-transmission light detector 410A1 is provided in the area 410C1. The sub-transmission light detector 410A2 is provided in the area 410C2. The sub-transmission light detector 410B1 is provided in the area 410C3. The sub-transmission light detector 410B2 is provided in the area 410C4. The areas 410C1, 410C2, 410C3 and 410C4 are separated from each other by separation lines 411 and 412 which are perpendicular to each other. The separation line 411 extends parallel to the rotation direction of the optical disc 170.

The diffraction light detector 420 includes two sub-diffraction light detectors 420A and 420B. The diffraction light detector 420 includes areas 420C1 and 420C2. The sub-diffraction light detector 420A is provided in the area 420C1. The sub-diffraction light detector 420B is provided in the area 420C2.

Positive first order diffraction light diffracted by the area 150a of the polarizing holographic face 150 (FIG. 1B) is focused before the sub-diffraction light detector 420A and collected on the sub-diffraction light detector 420A as a spot 382a. Positive first order diffraction light diffracted by the area 150b of the polarizing holographic face 150 is focused after the sub-diffraction light detector 420B and collected on the sub-diffraction light detector 420B as a spot 382b. In this example, whether the focal point is before or after the detection face does not matter. The focal point can be before or after the detection face.

The light transmitted through the polarizing holographic face 150 (0th order light or transmission light) is collected substantially at an intersection of the separation lines 411 and 412 of the transmission light detector 410 (in a central area of the transmission light detector 410) as a spot 381. In this case, the detection face of the transmission light detector 410 is substantially at a mid point between two focal lines (vertical focal line and horizontal focal line). Accordingly, when the spot 381 passes a focal line inclined clockwise at 45 degrees with respect to the separation line 412 before reaching the detection face of the transmission light detector 410, the light distribution is syxmnetiic with respect to the focal line. The light distribution of the spot 381 is equivalent to the light distribution which is rotated clockwise at 90 degrees from that of the spot 181 in the first example.

The sub-diffraction light detectors 420A and 420B of the diffraction light detector 420 each detect a light amount. A second tracing error signal 443s (TE2 signal) is obtained by subjecting the detected light amounts to subtraction performed by a subtracter 443. A reproduction signal 444s is obtained by subjecting the detected light amounts to addition performed by an adder 444. The TE2 signal corresponds to the TE2 signal detected by the photodetector 1190 shown in FIG. 11.

Based on detection results of the sub-transmission light detectors 410A1, 410A2, 410B1 and 410B2, a calculator 441 of the photodetector 400 outputs 410A1−410A2+410B1−410B2. The output from the calculator 441 is a first tracking error signal 441. (TE1 signal). The TE1 signal corresponds to the TE1 signal detected by the photodetector 1050 shown in FIG. 10B. Also based on detection results of the sub-transmission light detectors 410A1, 410A2, 410B1 and 410B2, a calculator 442 of the photodetector 400 outputs 410A1+410B2−410A2−410B1. The output from the calculator 442 is a third tracking error signal 442s (TE3 signal).

Like in the first example, the transmission light detector 410, which is substantially rectangular, is divided into sub-transmission light detectors 410A1, 410A2, 410B1 and 410B2, which are also substantially rectangular. In this case, the difference between the light amount detected by two sub-transmission light detectors adjacent in a direction parallel to the rotation direction of the optical disc 170 (410A1 and 410B1) (as described above, the light distribution is rotated clockwise at 90 degrees with respect to the light distribution in the first example, and therefore the separation line (412) parallel to the rotation direction of the optical disc 170 in the second example is also rotated at 90 degrees with respect to such a separation line (211) in the first example), and the light amount detected by the other two sub-transmission light detectors (410A2 and 410B2) is the TE1 signals The difference between the light amount detected by two sub-transmission light detectors orthogonally provided (410A1 and 410B2) and the light amount detected by the other two sub-transmission light detectors (410A2 and 410B1) is the TE3 signal.

A focusing error of the objective lens 360 is reflected as an astigmatism of the converged light 381 (difference between ±45 degree directions). Therefore, the third tracking error signal 442s calculated by the calculator 442 which outputs 410A1+410B2−410A2−410B1 corresponds to a focusing error signal (FE signal).

In this example also, three types of tracking error signals (TE1, TE2 and TE3 signals) are obtained. Like in the first example, these tracking error signals can be used in accordance with the type of the optical disc. For example, in the case of an optical disc having a pit depth corresponding to about ¼ of the wavelength (e.g., DVD-ROM disc), the control device. 185 can use a TE3 signal as a tracking error signal with respect to a pit signal (emboss signal).

In the case of an optical disc having a guide groove such as for example, a DVD-RAM disc or DVD-R disc, the control device 185 can use a calculation result value of TE2−k×TE1, obtained by using an appropriate constant k, as a tracking error signal. In this case, the control device 185 can update the value of k in accordance with the type of the optical disc.

Like in the first example, the degree of asymmetry of the tracking error signal caused by the shifting of the central axis of the objective lens 160 with respect to the optical axis of the optical disc apparatus 300 can be sufficiently suppressed. Off-track while the tracking control is performed can be solved. In this example, negative first order diffraction light is not used. Therefore, the cross-sectional shape of the polarizing holographic element 145 can be changed so as to eliminate the ratio of the negative first order diffraction light and thus increase the ratios of the 0th order and positive first order diffraction light. In this manner, the S/N ratio of the reproduction signal and the phase differential TE signal (TE3 signal) can be further improved compared to that of the first example.

As a modification of the second example, a sum of the light amounts detected by the sub-transmission light detectors 410A1, 410A2, 410B1 and 410B2 can be detected as a reproduction signal. In the case where the diffraction light ratios are 70% for the 0th order light and 10% for the positive first diffraction light, the detection index of the reproduction signal is about 35. In this manner, the light amounts can be adjusted so as to be largest for the transmission light, second largest for the positive first order diffraction light, and smallest for the negative first order diffraction light.

In the above description, the parallel flat plate 370 is used as the aberration section. The present invention is not limited to such a structure. For example, a wedge-like prism can be used as the aberration section.

EXAMPLE 3

Figure 5A:
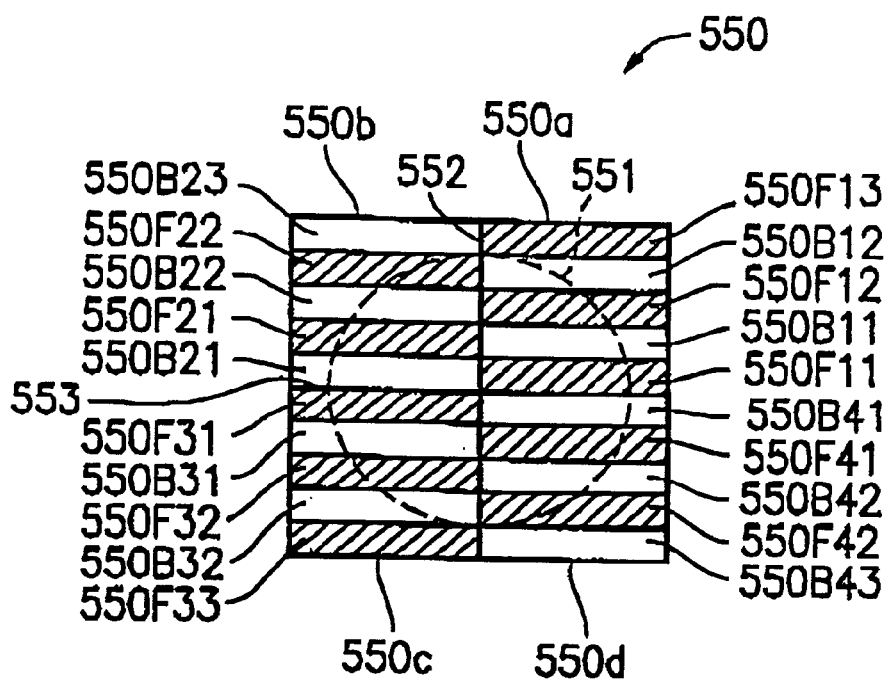
FIG. 5A shows a structure of a polarizing holographic face in an optical disc apparatus according to a third example.
Figure 5B:
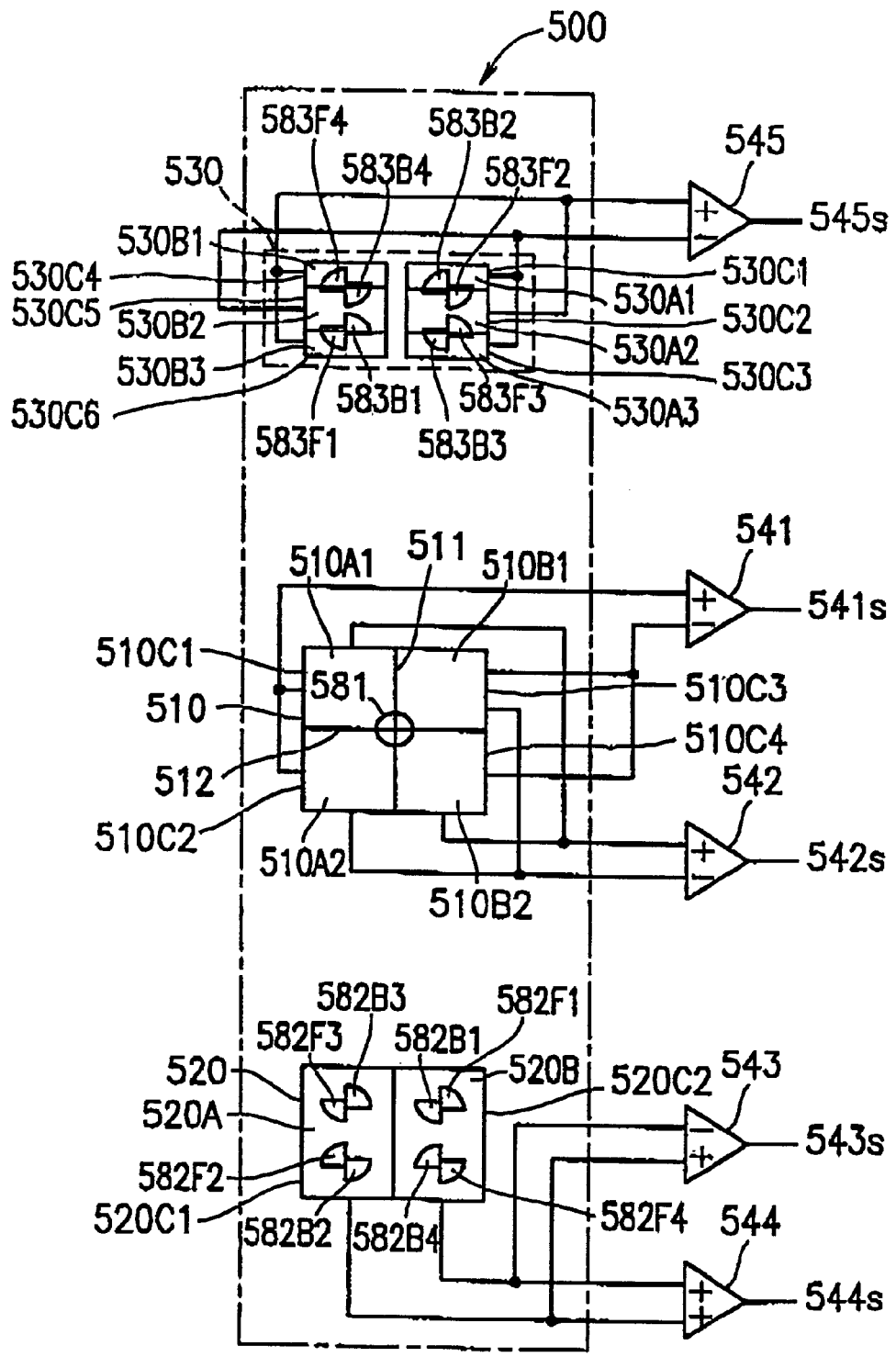
FIG. 5B shows a structure of a photodetector in the optical disc apparatus of the third example.

FIG. 5A shows a structure of a polarizing holographic face 550 of an optical disc apparatus according to a third example of the present invention. FIG. 5B shows a structure of a photodetector 500 of the optical disc apparatus according to the third example of the present invention. The optical disc apparatus according to the third example has the same structure as that of the optical disc apparatus 100 in the first example except for the polarizing holographic face 550 and the photodetector 500. The other elements will be described using the corresponding reference numerals in FIG. 1A.

In FIG. 5A, the polarizing holographic face 550 is divided into a first area 550a, a second area 550b, a third area 550a and a fourth area 550d having different holographic patterns, along separation lines 552 and 553. The separation line 552 is parallel to the rotation direction of the optical disc 170, and the separation line 553 is perpendicular to the separation line 552. A light beam 551 reflected by the optical disc 170 is substantially equally divided into four along the separation lines 552 and 553. The first area 550a is further divided into strip-shaped areas 550F11, 550B11, 550F12, 550B12 and 550F13 along separation lines parallel to the separation line 553. The second area 550b is further divided into strip-shaped areas 550B21, 550F21, 550B22, 550F22 and 550B23 along separation lines parallel to the separation line 553. The third area 550c is further divided into strip-shaped areas 55O31, 550B31, 550F32, 550B32 and 550F33 along separation lines parallel to the separation line 553. The fourth area 550d is further divided into strip-shaped areas 550B41, 550F41, 550B42, 550F42 and 550B43 along separation lines parallel to the separation line 553.

Negative first order diffraction light passing through the strip-shaped areas having the letter "F" in their reference numerals (e.g., 550F11 or 550F22) is collected before the photodetector 500. Negative first order diffraction light passing through the strip-shaped areas having the letter "B" in their reference numerals (e.g., 550B11 or 550B22) is collected after the photodetector 500.

Referring to FIG. 5B, the photodetector 500 includes a transmission light detector 510, a first diffraction light detector 520 and a second diffraction light detector 530. The transmission light detector 510 is provided in a central area of the photodetector 500. The first diffraction light detector 520 and the second diffraction light detector 530 are provided in a first outer area and a second outer area, respectively, of the photodetector 500 so as to interpose the transmission light detector 510 therebetween.

The transmission light detector 510 includes four sub-transmission light detectors 510A1, 510A2, 510B1 and 510B2. The transmission light detector 510 includes four areas 510C1, 510C2, 510C3 and 510C4. The sub-transmission light detector 510A1 is provided in the area 510C1. The sub-transmission light detector 510A2 is provided in the area 510C2. The sub-transmission light detector 510B1 is provided in the area 510C3. The sub-transmission light detector 510B2 is provided in the area 510C4. The areas 510C1, 510C2, 510C3 and 510C4 are separated from each other by separation lines 511 and 512 which are perpendicular to each other. The separation line 511 extends parallel to the rotation direction of the optical disc 170.

The first diffraction light detector 520 provided in the first outer area includes two sub-diffraction light detectors 520A and 520B. The first diffraction light detector 520 includes areas 520C1 and 520C2. The sub-diffraction light detector 520A is provided in the area 520C1. The sub-diffraction light detector 520B is provided in the area 520C2.

The second diffraction light detector 530 provided in the second outer area includes six sub-diffraction light detectors 530A1, 530A2, 530A3, 530B1, 530B2 and 530B3. The sub-diffraction light detectors 530A1, 530B2 and 530A3 are electrically conductive to each other. The sub-diffraction light detectors 530B1, 530A2 and 530B3 are also electrxically conductive to each other. The second diffraction light detector 530 includes areas 530C1, 530C2, 530C3, 530C4, 530C5 and 530C6. The sub-diffraction light detector 530A1 is provided in the area 530C1. The sub-diffraction light detector 530A2 is provided in the area 530C2. The sub-diffraction light detector 530A3 is provided in the area 530C3. The sub-diffraction light detector 530B1 is provided in the area 530C4. The sub-diffraction light detector 530B2 is provided in the area 530C5. The sub-diffraction light detector 530B3 is provided in the area 530C6.

Positive first order diffraction light diffracted by the strip-shaped areas 550B11 and 550B12 of the first area 550a of the polarizing holographic face 550 (FIG. 5A; not adjacent to each other but interposing the area 550F12 therebetween) is collected on the sub-diffraction light detector 520B as a spot 582B1. Negative first order diffraction light diffracted by the strip-shaped areas 50B11 and 50B12 is collected on the sub-diffraction light detector 530B3 while being also on the sub-diffraction light detector 530B2 as a spot 583B1.

Positive first order diffraction light diffracted by the other strip-shaped areas 550F11, 550F12 and 550F13 is collected on the sub-diffraction light detector 520B as a spot 582F1. Negative first order diffraction light diffracted by the strip-shaped areas 550F11, 550F12 and 550F13 is collected on the sub-diffraction light detector 530B2 while being also on the sub-diffraction light detector 530B3 as a spot 583F1.

Positive first order diffraction light diffracted by the strip-shaped areas 550B21, 550B22 and 550B23 of the second area 550b (FIG. 5A; not adjacent to each other but interposing the areas 550F21 and 550F22 therebetween) is collected on the sub-diffraction light detector 520A as a spot 582B2. Negative first order diffraction light diffracted by the strip-shaped areas 550B21, 550B22 and 550B23 is collected on the sub-diffraction light detector 530A2 while being also on the sub-diffraction light detector 530A1 as a spot 583B2.

Positive first order diffraction light diffracted by the other strip-shaped areas 550F21 and 550F22 is collected on the sub-diffraction light detector 520A as a spot 582F2. Negative first order diffraction light diffracted by the strip-shaped areas 550F21 and 550F22 is collected on the sub-diffraction light detector 530A1 while being also on the sub-diffraction light detector 530A2 as a spot 583F2.

Positive first order diffraction light diffracted by the strip-shaped areas 550B31 and 550B32 of the third area 550c (FIG. 5A; not adjacent to each other but interposing the area 550F32 therebetween) is collected on the sub-diffraction light detector 520A as a spot 582B3. Negative first order diffraction light diffracted by the strip-shaped areas 550B31 and 550B32 is collected on the sub-diffraction light detector 530A2 while being also on the sub-diffraction light detector 530A3 as a spot 583B3.

Positive first order diffraction light diffracted by the other strip-shaped areas 550F31, 550F32 and 550F33 is collected on the sub-diffraction light detector 520A as a spot 582F3. Negative first order diffraction light diffracted by the strip-shaped areas 550F31, 550F32 and 550F33 is collected on the sub-diffraction light detector 530A3 while being also on the sub-diffraction light detector 530A2 as a spot 583F3.

Positive first order diffraction light diffracted by the strip-shaped areas 550B41, 55O42 and 550B43 of the fourth area 550d (FIG. 5A: not adjacent to each other but interposing the areas 550F41 and 550F42 therebetween) is collected on the sub-diffraction light detector 520B as a spot 582B4. Negative first order diffraction light diffracted by the strip-shaped areas 550B41, 550B42 and 550B43 is collected on the sub-diffraction light detector 530B1 while being also on the sub-diffraction light detector 530B2 as a spot 583B4.

Positive first order diffraction light diffracted by the other strip-shaped areas 550F41 and 550F42 is collected on the sub-diffraction light detector 520B as a spot 582F4. Negative first order diffraction light diffracted by the strip-shaped areas 550F41 and 550F42 is collected on the sub-diffraction light detector 530B2 while being also on the sub-diffraction light detector 530B1 as a spot 583F4.

The light transmitted through the polarizing holographic face 550 (0th order light) is collected substantially at an intersection of the separation lines 511 and 512 of the transmission light detector 510 (in a central area of the transmission light detector 510) as a spot 581. The focal point of the spot 581 is after the detection face of the transmission light detector 510.

The sub-diffraction light detectors 520A and 520B of the first diffraction light detector 520 each detect a light amount. A second tracking error signal 543S (TE2 signal) is obtained by subjecting the detected light amounts to a subtraction performed by a subtracter 543. A reproduction signal 544s is obtained by subjecting the detected light amounts to addition performed by an adder 544. The TE2 signal corresponds to the TE2 signal detected by the photodetector 1190 shown in FIG. 11C.

The TE2 signal corresponds to a difference between the light amount of the positive first order diffraction light diffracted by the first area 550a and the fourth area 550d of the polarizing holographic face 550 and the light amount of the positive first order diffraction light diffracted by the second area 550b and the third area 550a of the polarizing holographic face 550. The reproduction signal corresponds to a sum of the light amount of the positive first order diffraction light diffracted by the first area 550a, the second area 550b, the third area 550a and the fourth area 550d.

Based on detection results of the sub-transmission light detectors 510A1, 510A2, 5101B and 510B2, a calculator 541 of the photodetector 500 outputs 510A1+510A2−510B1−510B2. The output from the calculator 541 is a first tracking error signal 541. (TE1 signal). The TE1 signal corresponds to the TE1 signal detected by the photodetector 1050 shown in FIG. 10B. Also based on detection results of the sub-transmission light detectors 510A1, 510A2, 51031 and 510B2, a calculator 542 of the photodetector 500 outputs 510A1+510B2−510A2−510B1. The output from the calculator 542 is a third tracking error signal 542s (TE3 signal).

In this example also, the transmission light detector 510, which is substantially rectangular, is divided into sub-transmlssion light detectors 510A1, 510A2, 5101B and 510B2, which are also substantially rectangular. In this case, the difference between the light amount detected by two sub-trenomission light detectors adjacent in a direction parallel to the rotation direction of the optical disc 170 (510A1 and 510A2) and the light amount detected by the other two sub-transmission light detectors (510B1 and 5S0B2) in the TE1 signal. The difference between the light amount detected by two sub-transmission light detectors orthogonally provided (510A1 and 510B2) and the light amount detected by the other two sub-transmlssion light detectors (510A2 and 510B1) is the TE3 signal.

A calculator 545 outputs 530B1+530B3+530A2−530A1−530A3−530B2. The output of the calculator 545 is a focusing error signal 545s (FE signal).

In this example also, three types of tracking error signals (TE1, TE2 and TE3 signals) are obtained. Like in the first example, these tracking error signals can be used in accordance with the type of the optical disc. For example, in the case of an optical disc having a pit depth corresponding to about ¼ of the wavelength (e.g., DVD-ROM disc), the control device 185 can use a TE3 signal as a tracking error signal with respect to a pit signal (emboss signal).

In the case of an optical disc having a guide groove such as, for example, a DVD-RAM disc or DVD-R disc, the control device 185 can use a calculation result value of TE2−k×TE1 obtained, by using an appropriate constant k, as a tracking error signal. In this case, the control device 185 can update the value of k in accordance with the type of the optical disc.

Like in the first example, the degree of asymmetry of the tracking error signal caused by the shifting of the central axis of the objective lens 160 with respect to the optical axis of the optical disc apparatus 300 can be sufficiently suppressed. Off-track while the tracking control is performed can be solved. In this example, the polarizing holographic face 550 is divided into small strip-shaped areas. Using these small strip-shaped areas, a light component to be collected before the photodetector 500 and a light component to be collected after the photodetector 500 are generated. The resultant diffraction light is detected as an FE signal. Therefore, the adverse influence of dust and stains present on the substrate 172 of the optical disc 170 is negated. Thus, the focusing error control to highly stable.

In the above description, the sub-diffraction light detector 530B1 is electrically conductive to the sub-diffraction light detectors 530B3 and 530A2, and the sub-diffraction light detector 530B2 is electrically conductive to the sub-diffraction light detector 530A1 and 530A3. The difference between the outputs from the two groups of the sub-diffraction light detector is generated as an FE signal. Alternatively, the sub-diffraction light detectors 530B1 and 530B3, 530A1 and 530A3 can be electrically conductive to each other, and the sub-diffraction light detector 530B2 can be electrically conductive to the sub-diffraction light detector 530A2. In this case, an FE signal can be generated by a difference signal thereof (i.e., 530B1+530B3+530A1+530A3−530B2−530A2). In this case on the second diffraction light detector 530, the spots 583B1 and 583F1 are exchanged with the spots 583B4 and 583F4. Or on the second diffraction light detector 530, the spots 583B3 and 583F3 are exchanged with the spots 58382 and 583F2. The spots on the first diffraction light detector 520 are exchanged in correspondence therewith.

The polarizing holographic face 550 is not necessarily divided into the small strip-shaped areas. When the polarizing holographic face 550 is not divided as shown in FIG. 5A, the first area 550a and the third area 550a are entirely areas shown with "B", and the second area 550b and the fourth area 550d are entirely areas shown with "F". The spots 583F1, 583B2, 583F3 and 583B4 on the second diffraction light detector 530, and the spots 582F1, 582B2, 582F3 and 582B4 on the first diffraction light detector 520 are eliminated. Only the spots 583B1, 583F2, 583B3 and 583F4 on the second diffraction light detector 530, and the spots 582B1, 582F2, 582B3 and 582F4 on the first diffraction light detector 520 are left.

EXAMPLE 4

Figure 6A:
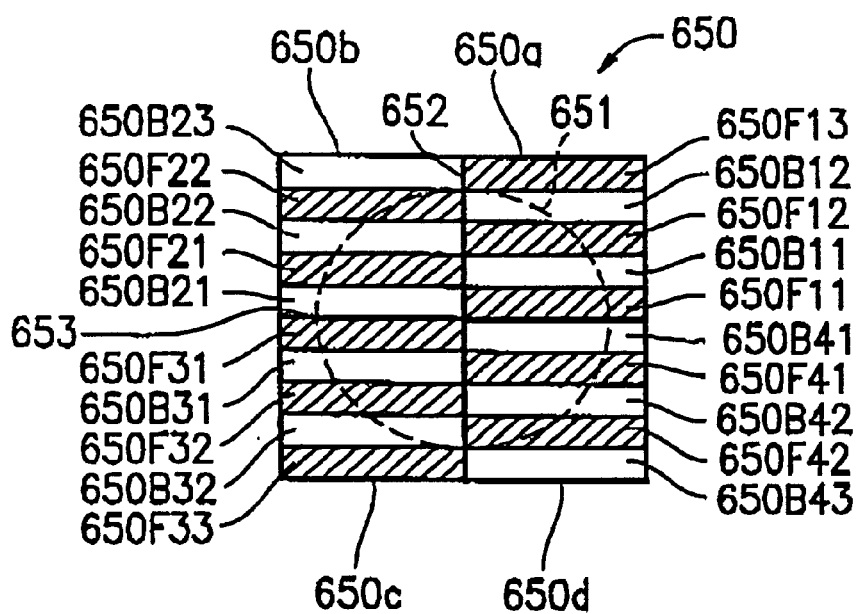
FIG. 6A shows a structure of a polarizing holographic face in an optical disc apparatus according to a fourth example of the present invention.
Figure 6B:
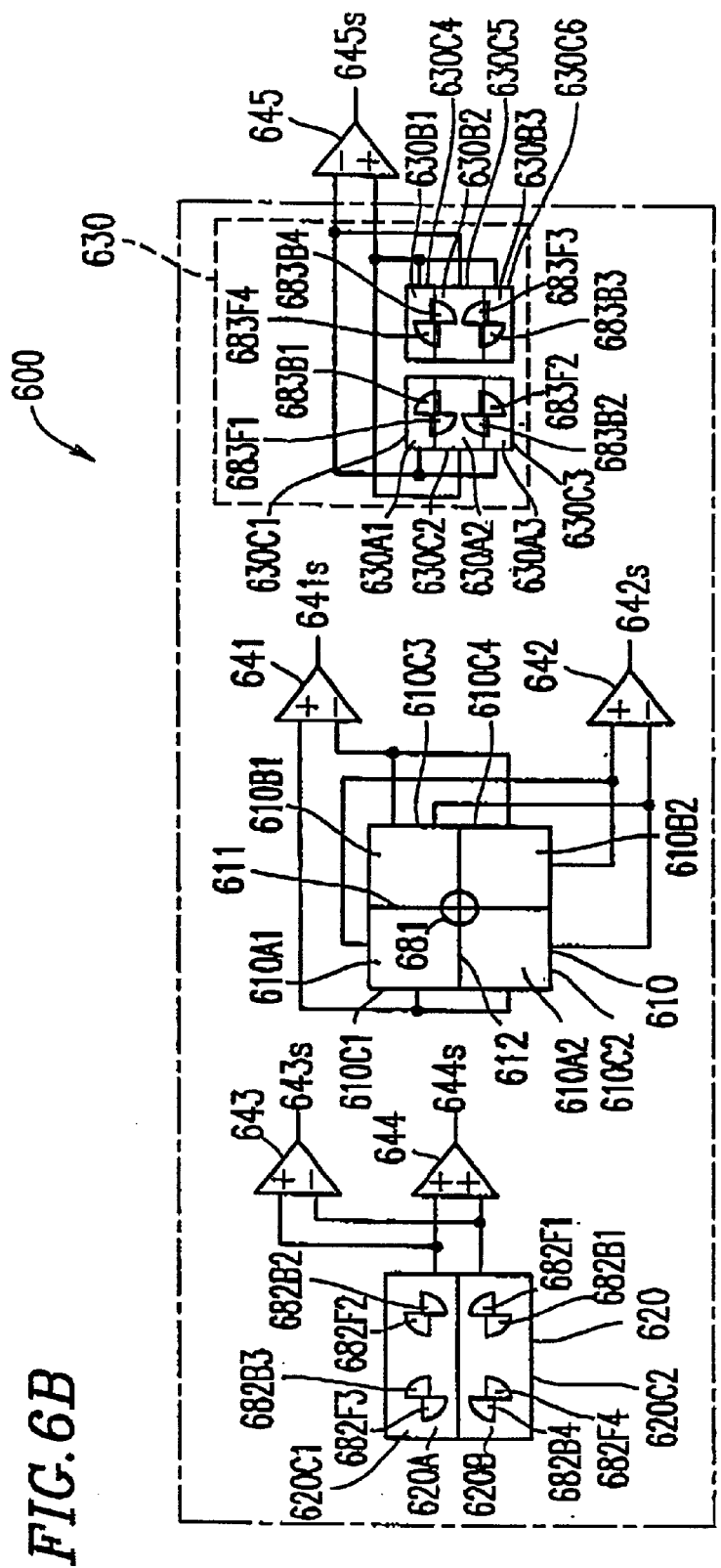
FIG. 6B shows a structure of a photodetector in the optical disc apparatus of the fourth example.

FIG. 6A shows a structure of a polarizing holographic face 650 of an optical disc apparatus according to a fourth example of the present invention. FIG. 6B shows a structure of a photodetector 600 of the optical disc apparatus according to the fourth example of the present invention. The optical disc apparatus according to the fourth example has the same structure as that of the optical disc apparatus 100 in the first example except for the polarizing holographic face 650 and the photodetector 600. The other elements will be described using the corresponding reference numerals in FIG. 1A.

In FIG. 6A, the polarizing holographic face 650 is divided into a first area 650a, a second area 650b, a third area 650c and a fourth area 650d having different holographic patterns, along separation lines 652 and 653. The separation line 652 is parallel to the rotation direction of the optical disc 170, and the separation line 653 is perpendicular to the separation line 652. A light beam 651 reflected by the optical disc 170 is substantially equally divided into four along the separation line 652 and 653. The first area 650a is further divided into strip-shaped areas 650F11, 650B11, 650F12, 650B12 and 650F13 along separation lines parallel to the separation line 653. The second area 650b is further divided into strip-shaped areas 650321, 650F21, 650B22, 650F22 and 650B23 along separation lines parallel to the separation line 653. The third area 650c is further divided into strip-shaped areas 650F31, 650B31, 650F32, 650B32 and 650F33 along separation lines parallel to the separation line 653. The fourth area 650d is further divided into strip-shaped areas 650B41, 650P41, 650B42, 650F42 and 650B43 along separation lines parallel to the separation line 653.

Negative first order diffraction light passing through the strip-shaped areas having the letter "F" in their reference numerals (e.g., 650F11 or 650F22) is collected before the photodetector 600. Negative first order diffraction light passing through the strip-shaped areas having the letter "B" in their reference numerals (e.g., 650B11 or 650B22) is collected after the photodetector 600.

Referring to FIG. 6B, the photodetector 600 includes a transmission light detector 610, a first diffraction light detector 620 and a second diffraction light detector 630 the transmission light detector 610 is provided in a central area of the photodetector 600. The first diffraction light detector 620 and the second diffraction light detector 630 are provided in a first outer area and a second outer area, respectively, of the photodetector 600 so as to interpose the transmission light detector 610 therebetween.

The transmission light detector 610 includes four sub-transmission light detectors 610A1, 610A2, 6103B and 610B2. The transmission light detector 610 includes four areas 610C1, 610C2, 610C3 and 610C4. The sub-transmission light detector 610A1 is provided in the area S10C1. The sub-transmission light detector 610A2 is provided in the area 610C2. The sub-transmission light detector 610B1 is provided in the area 610C3. The sub-transmission light detector 610B2 is provided in the area 610C4. The areas 610C1, 610C2, 610C3 and 610C4 are separated from each other by separation lines 611 and 612 which are perpendicular to each other. The separation line 611 extends parallel to the rotation direction of the optical disc 170.

The first diffraction light detector 620 provided in the first outer area includes two sub-diffraction light detectors 620A and 620B. The first diffraction light detector 620 includes areas 620C1 and 620C2. The sub-diffraction light detector 620A is provided in the area 620C1 The sub-diffraction light detector 620B is provided in the area 620C2.

The second diffraction light detector 630 provided in the second outer area includes six sub-diffraction light detectors 630A1, 630A2, 630A3, 630B1, 630B2 and 630B3. The sub-diffraction light detectors 630A1, 630B2 and 630A3 are electrically conductive to each other. The sub-diffraction light detectors 630B1, 630A2 and 630B3 are also electrically conductive to each other. The second diffraction light detector 630 includes areas 630C1, 630C2, 630C3, 630C4, 630C5 and 630C6. The sub-diffraction light detector 630A1 is provided in the area 630C1. The sub-diffraction light detector 630A2 is provided in the area 630C2. The sub-diffraction light detector 630A3 is provided in the area 630C3. The sub-diffraction light detector 630B1 is provided in the area 630C4. The sub-diffraction light detector 630B2 is provided in the area 630C5. The sub-diffraction light detector 630B3 is provided in the area 630C6.

Positive first order diffraction light diffracted by the strip-shaped areas 650B11 and 650B12 of the first area 650a of the polarizing holographic face 650 (FIG. 5A; not adjacent to each other but interposing the area 650F12 therebetween) is collected on the sub-diffraction light detector 620B as a spot 682B1. Negative first order diffraction light diffracted by the strip-shaped areas 650B11 and 650B12 is collected on the sub-diffraction light detector 630A2 while being also on the sub-diffraction light detector 630A1 as a spot 683B1.

Positive first order diffraction light diffracted by the other strip-shaped areas 650F11, 650F12 and 650F13 is collected on the sub-diffraction light detector 6208 as a spot 682F1. Negative first order diffraction light diffracted by the strip-shaped areas 650F11, 650F12 and 650F13 is collected on the sub-diffraction light detector 630A1 while being also on the sub-diffraction light detector 630A2 as a spot 683F1.

Positive first order diffraction light diffracted by the strip-shaped areas 650B21, 650B22 and 650B23 of the second area 650b (FIG. 6A: not adjacent to each other but interposing the areas 650P21 and 650P22 therebetween) is collected on the sub-diffraction light detector 620A as a spot 682B2. Negative first order diffraction light diffracted by the strip-shaped areas 650B21, 650B22 and 650B23 is collected on the sub-diffraction light detector 630A3 while being also on the sub-diffraction light detector 630A2 as a spot 683B2.

Positive first order diffraction light diffracted by the other strip-shaped areas 650F21 and 650F22 is collected on the sub-diffraction light detector. 620A as a spot 682F2. Negative first order diffraction light diffracted by the strip-shaped areas 660F21 and 650P22 is collected on the sub-diffraction light detector 630A2 while being also on the sub-diffraction light detector 630A3 as a spot 683F2.

Positive first order diffraction light diffracted by the strip-shaped areas 650B31 and 650B32 of the third area 650c (FIG. 6A not adjacent to each other but interposing the area 650F32 therebetween) is collected on the sub-diffraction light detector 620A as a spot 682B3. Negative first order diffraction-light diffracted by the strip-shaped areas 650B31 and 650B32 is collected on the sub-diffraction light detector 630B2 while being also on the sub-diffraction light detector 630B3 as a spot 683B3.

Positive first order diffraction light diffracted by the other strip-shaped areas 650F31, 650F32 and 650F33 is collected on the sub-diffraction light detector 620A as a spot 682F3. Negative first order diffraction light diffracted by the strip-shaped areas 650F31, 650F32 and 650F33 is collected on the sub-diffraction light detector 630B3 while being also on the sub-diffraction light detector 630B2 as a spot 683F3.

Positive first order diffraction light diffracted by the strip-shaped areas 650B41, 650B42 and 650B43 of the fourth area 650d (FIG. 6A; not adjacent to each other but interposing the areas 650F41 and 650F42 therebetween) is collected on the sub-diffraction light detector 620B as a spot 682B4. Negative first order diffraction light diffracted by the strip-shaped areas 650341, 650B42 and 650B43 is collected on the sub-diffraction light detector 630B1 while being also on the sub-diffraction light detector 630B2 as a spot 683B4.

Positive first order diffraction light diffracted by the other strip-shaped areas 650F41 and 650F42 is collected on the sub-diffraction light detector 620B as a spot 682F4. Negative first order diffraction light diffracted by the strip-shaped areas 650F41 and 650F42 is collected on the sub-diffraction light detector 630B2 while being also on the sub-diffraction light detector 630B1 as a spot 683F4.

The light transmitted through the polarizing holographic face 650 (0th order light) is collected substantially at an intersection of the separation lines 611 and 612 of the transmission light detector 610 (in a central area of the transmission light detector 610) as a spot 681. The spot 681 is focused after the detection face of the transmission light detector 610.

The sub-diffraction light detectors 620A and 620B of the first diffraction light detector 620 each detect a light amount. A second tracking error signal 643s (TE2 signal) is obtained by subjecting the detected light amounts to a subtraction performed by a subtracter 643 A reproduction signal 644s is obtained by subjecting the detected light amounts to addition performed by an adder 644. The TE2 signal corresponds to the TE2 signal detected by the photodetector 1190 shown in FIG. 1C.

The TE2 signal corresponds to a difference between the light amount of the positive first order diffraction light diffracted by the first area 650a and the fourth area 650d of the polarizing holographic face 650 and the light amount of the positive first order diffraction light diffracted by the second area 650b and the third area 650c of the polarizing holographic face 650. The reproduction signal corresponds to a sum of the light amount of the positive first order diffraction light diffracted by the first area 650a, the second area 650b, the third area 650c and the fourth area 650d.

Based on detection results of the sub-transmission light detectors 610A1, 610A2, 610B1 and 610B2, a calculator 641 of the photodetector 600 outputs 610A1+610A2−610B1−610B2. The output from the calculator 641 is a first tracking error signal 641s (TE1 signal). The TE1 signal corresponds to the TE1 signal detected by the photodetector 1050 shown in FIG. 10B. Also based on detection results of the sub-transmission light detectors 610A1, 610A2, 610B1 and 610B2 a calculator 642 of the photodetector 600 outputs 610A1+610B2−610A2−610B1. The output from the calculator 642 is a third tracking error signal 642c (TE3 signal).

A calculator 645 outputs 630B1+630B3+630A2−630A1−630A3−630B2. The output of the calculator 645 it a focusing error signal (FE signal).

In this example also, three types of tracking error signals (TE1, TE2 and TE3 signals) are obtained. Like in the first example, these tracking error signals can be used in accordance with the type of the optical disc. For example, in the case of an optical disc having a pit depth corresponding to about ¼ of the wavelength (e.g., DVD-ROM disc), the control device 185 can use a TE3 signal as a tracking error signal with respect to a pit signal (emboss signal).

In the case of an optical disc having a guide groove such as, for example, a DVD-RAM disc or DVD-R disc, the control device 185 can be a calculation result value of TE2−k×TE1, obtained by using an appropriate constant k, as a tracking error signal. In this case, the control device 185 can update the value of k in accordance with the type of the optical disc.

Like in the first example, the degree of asymmetry of the tracking error signal caused by the shifting of the central axis of the objective lens 160 with respect to the optical axis of the optical disc apparatus can be sufficiently suppressed. Off-track while the tracking control is performed can be solved. In this example, the polarizing holographic face 650 is divided into small strip-shaped areas. Using these small strip-shaped areas, a light component to be collected before the photodetector 600 and a light component to be collected after the photodetector 600 are generated. The resultant diffraction light is detected as an FE signal. Therefore the adverse influence of dust and stains present on the substrate 172 of the optical disc 170 is negated. Thus, the focusing error control is highly stable. In the fourth example, unlike in the third example, the separation lines for separating the sub-diffraction light detectors 630A1, 630A2 and 630A3 and the separation lines for separating the sub-diffraction light detectors 630B1, 630B2 and 630B3 are along the diffraction direction of the light. Therefore, when there is a wavelength error or wavelength shift, the spots on the second diffraction light detector 630 move along these separation lines. Thus, a detection error of focusing on the optical disc can be sufficiently avoided.

The first and third examples have advantages that there is ample room for rotation adjustment of the photodetector, despite the possibility of an FE detection error due to a wavelength error or wavelength shift. The separation lines between the sub-diffraction light detectors used for detecting an FE signal may or may not be along the diffraction direction of the light in accordance with the design idea. In the first, second, third and the following examples, the separation lines are perpendicular to the diffraction direction. The structures in these examples can be modified so that the separation lines are parallel to the diffraction direction.

EXAMPLE 5

Figure 7A:
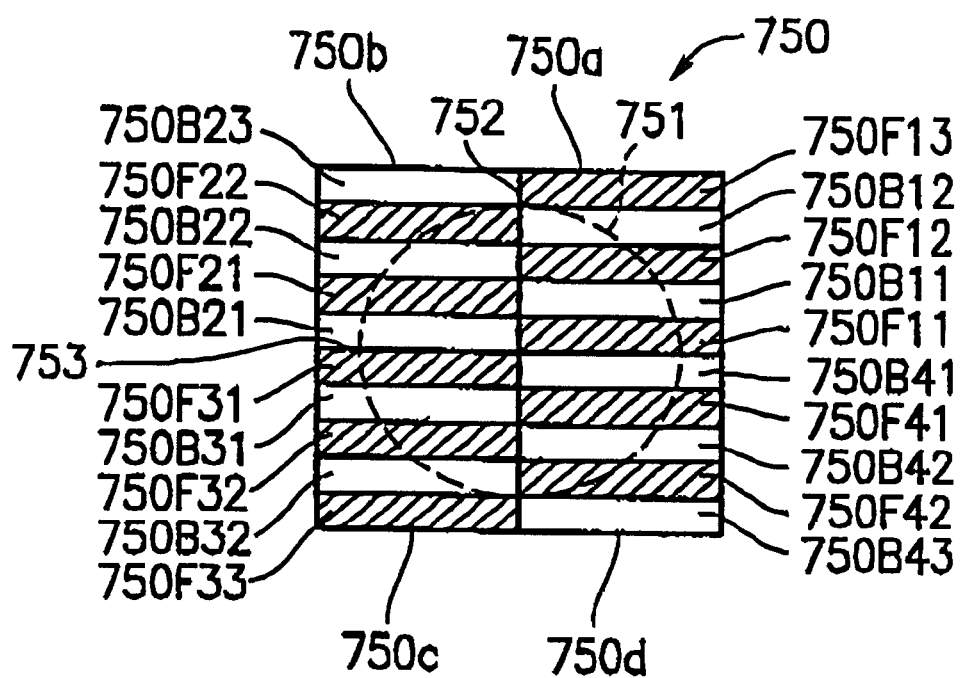
FIG. 7A shows a structure of a polarizing holographic face in an optical disc apparatus according to a fifth example of the present invention.
Figure 7B:
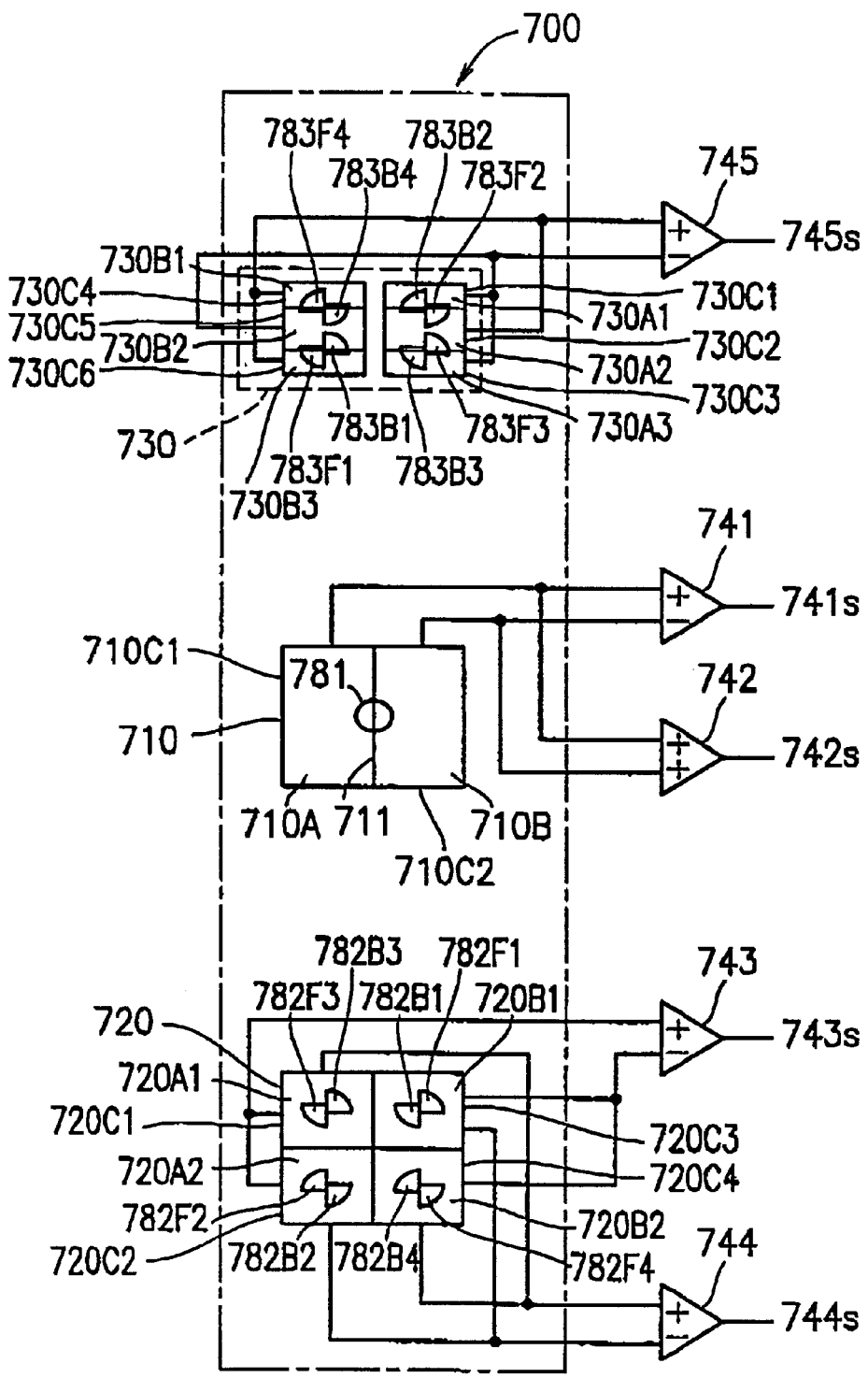
FIG. 7B shows a structure of a photodetector in the optical disc apparatus of the fifth example.

FIG. 7A shows a structure of a polarizing holographic face 750 of an optical disc apparatus according to a fifth example of the present invention. FIG. 7B shows a structure of a photodetector 700 of the optical disc apparatus according to the fifth example of the present invention. The optical disc apparatus according to the fifth example has the same structure as that of the optical disc apparatus 100 in the first example except for the polarizing holographic face 750 and the photodetector 700. The other elements will be described using the corresponding reference numerals in FIG. 1A.

In FIG. 7A, the polarizing holographic face 750 is divided into a first area 750a, a second area 750b, a third area 750a and a fourth area 750d having different holographic patterns, along separation lines 752 and 753. The separation line 752 is parallel to the rotation direction of the optical disc 170, and the separation line 753 is perpendicular to the separation line 752. A light beam 751 reflected by the optical disc 170 is substantially equally divided into four along the separation lines 752 and 753. The first area 750a is further divided into strip-shaped areas 750F11, 750B11, 750F12, 750B12 and 750F13 along separation lines parallel to the separation line 753. The second area 750b is further divided into strip-shaped areas 750B21, 750F21, 750B22, 750F22 and 750823 along separation lines parallel to the separation line 753. The third area 750c is further divided into strip-shaped areas 750F31, 750B31, 750F32, 750B32 and 750F33 along separation lines parallel to the separation line 753. The fourth area 750d is further divided into strip-shaped areas 750B41, 750F41, 750B42. 750F42 and 750B43 along separation lines parallel to the separation line 753.

Negative first order diffraction light passing through the strip-shaped areas having the letter "F" in their reference numerals (e.g., 750F11 or 750F22) is collected before the photodetector 700. Negative first order diffraction light passing through the strip-shaped areas having the letter "B" in their reference numerals (e.g., 750B11 or 750B22) is collected after the photodetector 700.

Referring to FIG. 7B, the photodetector 700 includes a transmission light detector 710, a first diffraction light detector 720 and a second diffraction light detector 730. The transmission light detector 710 is provided in a central area of the photodetector 700. The first diffraction light detector 720 and the second diffraction light detector 730 are provided in a first outer area and a second outer area, respectively of the photodetector 700 so as to interpose the transmission light detector 710 therebetween.

The transmission light detector 710 includes two sub-transmission light detectors 710A and 710B. The transmission light detector 710 includes two areas 710C1 and 710C2. The sub-transmission light detector 710A is provided in the area 710C1. The sub-transmission light detector 710B is provided in the area 710C2. The areas 710C1 and 710C2 are separated from each other by a separation line 711. The separation line 711 extends parallel to the rotation direction of the optical disc 170.

The first diffraction light detector 720 provided in the first outer area includes four sub-diffraction light detectors 720A1, 720A2, 720B1 and 720B2. The first diffraction light detector 720 includes areas 720C1, 720C2, 720C3 and 720C4. The sub-diffraction light detector 720A1 is provided in the area 720C1. The sub-diffraction light detector 720A2 is provided in the area 720C2. The sub-diffraction light detector 720B1 in provided in the area 720C3. The sub-diffraction light detector 720B2 is provided in the area 720C4.

The second diffraction light detector 730 provided in the second outer area includes six sub-diffraction light detectors 730A1, 730A2, 730A3, 730B3, 730B2 and 73033 like in the third example. The sub-diffraction light detectors 730A1, 730B2 and 730A3 are electrically conductive to each other The sub-diffraction light detectors 730B1, 730A2 and 73033 are also electrically conductive to each other. The second diffraction light detector 730 includes areas 730C1, 730C2, 730C3, 730C4, 730C5 and 730C6. The sub-diffraction light detector 730A1 is provided in the area 730C1. The sub-diffraction light detector 730A2 is provided in the area 730C2. The sub-diffraction light detector 730A3 is provided in the area 730C3. The sub-diffraction light detector 730B1 is provided in the area 730C4. The sub-diffraction light detector 730B2 is provided in the area 730C5. The sub-diffraction light detector 730B3 is provided in the area 730C6.

Positive first order diffraction light diffracted by the strip-shaped areas 750811 and 750B12 of the first area 750a of the polarizing holographic face 750 (FIG. 7A; not adjacent to each other but interposing the area 750F2 therebetween) is collected on the sub-diffraction light detector 720B1 as a spot 782B1. Negative first order diffraction light diffracted by the strip-shaped areas 750B11 and 750B12 is collected on the sub-diffraction light detector 730B3 while being also on the sub-diffraction light detector 73032 as a spot 783B1.

Positive first order diffraction light diffracted by the other strip-shaped areas 750F11, 750F12 and 750F13 is collected on the sub-diffraction light detector 720B1 as a spot 782F1. Negative first order diffraction light diffracted by the strip-shaped areas 750F11, 750F12 and 750F13 is collected on the sub-diffraction light detector 730B2 while being also on the sub-diffraction light detector 730B3 as a spot 783F1.

Positive first order diffraction light diffracted by the strip-shaped areas 750B21, 750B22 and 7503B23 of the second area 750b (FIG. 7A; not adjacent to each other but interposing the areas 750F21 and 750F22 therebetween) is collected on the sub-diffraction light detector 720A2 as a spot 782B2. Negative first order diffraction light diffracted by the strip-shaped areas 750B21, 750B22 and 750B23 is collected on the sub-diffraction light detector 730A2 while being also on the sub-diffraction light detector 730A1 as a spot 783B2.

Positive first order diffraction light diffracted by the other strip-shaped areas 750F21 and 750F22 is collected on the sub-diffraction light detector 720A2 as a spot 782F2. Negative first order diffraction light diffracted by the strip-shaped areas 750F21 and 750F22 is collected on the sub-diffraction light detector 730A1 while being also on the sub-diffraction light detector 730A2 as a spot 783F2.

Positive first order diffraction light diffracted by the strip-shaped areas 750B31 and 750B32 of the third area 750c (FIG. 7A: not adjacent to each other but interposing the area 750F32 therebetween) is collected on the sub-diffraction light detector 720A1 as a spot 782B3. Negative first order diffraction light diffracted by the strip-shaped areas 750B31 and 750B32 is collected on the sub-diffraction light detector 730A2 while being also on the sub-diffraction light detector 730A3 as a spot 783B3.

Positive first order diffraction light diffracted by the other strip-shaped areas 750F31, 750F32 and 750F33 is collected on the sub-diffraction light detector 720A1 as a spot 782F3. Negative first order diffraction light diffracted by the strip-shaped areas 750F31, 750F32 and 750F33 is collected on the sub-diffraction light detector 730A3 while being also on the sub-diffraction light detector 730A2 as a spot 783F3.

Positive first order diffraction light diffracted by the strip-shaped areas 750B41, 750B42 and 750B43 of the fourth area 750d (FIG. 7A: not adjacent to each other but interposing the areas 750F41 and 750F42 therebetween) is collected on the sub-diffraction light detector 720B2 as a spot 782B4. Negative first order diffraction light diffracted by the strip-shaped areas 750B41. 750B42 and 750B43 is collected on the sub-diffraction light detector 730B1 while being also on the sub-diffraction light detector 73092 as a spot 783B4.

Positive first order diffraction light diffracted by the other strip-shaped areas 750P41 and 750F42 is collected on the sub-diffraction light detector 720B2 as a spot 782P4. Negative first order diffraction light diffracted by the strip-shaped areas 750F41 and 750F42 is collected on the sub-diffraction light detector 730B2 while being also on the sub-diffraction light detector 730B1 as a spot 783F4.

The light transmitted through the polarizing holographic face 750 (0th order light) is collected at a substantial center of the separation line 711 as a spot 781. The spot 781 is focused before the detection face of the transmission light detector 710. The sub-transmission light detectors 710A and 710B of the transmission light detector 710 each detect a light amount. A tracking error signal 741s (TE1 signal) is obtained by subjecting the detected light amounts to a subtraction performed by a subtracter 741. A reproduction signal 742s is obtained by subjecting the detected light amounts to addition performed by an adder 742. The TE1 signal corresponds to the TE1 signal detected by the photodetector 1050 shown in FIG. 10B.

In this example also, the transmission light detector 710, which is substantially rectangular, is divided into sub-transmission light detectors 710A and 710B, which are also substantially rectangular. In this case, the difference between the light amounts detected by the sub-transmission light detectors 710A and 710B separated from each other by the separation line 711 which extends parallel to the rotation direction of the optical disc 170 is the TE1 signal. The sum of the light amounts detected by the sub-transmission light detectors 710A and 710B is the reproduction signal.

Based on detection results of the sub-diffraction light detectors 720A1, 720A2, 720B1 and 720B2, a calculator 743 of the photodetector 700 outputs 720A1+720A2−

720B1–720B2. The output from the calculator 743 is a second tracking error signal 743s (TE2 signal). The TE2 signal corresponds to the TE2 signal detected by the photodetector 1190 shown in FIG. 1C. Also based on detection results of the sub-diffraction light detectors 720A1, 720A2, 720B1 and 720B2, a calculator 745 of the photodetector 700 outputs 720A1+720B2−720A2−720B1. The output from the calculator 744 is a third tracking error signal 743s (TE3 signal).

Based on detection results of the sub-diffraction light detectors 730A1, 730A2, 730A3, 730B1, 730B2 and 730B3, a calculator 745 outputs 730B1+730B3+730A2−730A1−730A3−730B2. The output of the calculator 745 is a focusing error signal 745s (FE signal).

Like in the first example, the phase distribution of the wave surface of the light immediately after being transmitted through the polarizing holographic face 750 has a sawtooth-like or step-like shape. The phase distribution 19, or the holographic pattern, has a sawtooth-like or step-like shape, the pattern being continuous over sequential cycles. In this example, the phase difference between the first step and the second step, and the phase difference between the second step and the third step are significantly small. In this manner, the diffraction light amount ratio can be 70% for the 0th order light, 15% for the positive first order diffraction light and 5% for the negative first order diffraction light. Since the diffraction efficiency of the ±1st order diffraction light is small, the diffraction loss is also small. As a result, the total diffraction light amount (i.e., 70+15+5=90%) is larger than that of the first example. Thus, the light amounts can be adjusted so as to be largest for the transmission light, second largest for the positive first order diffraction light, and smallest for the negative first order diffraction light.

In this example also three types of tracking error signals (TE1, TE2 and TE3 signals) are obtained. Like in the first example, these tracking error signals can be used in accordance with the type of the optical disc. For example, in the case of an optical disc having a pit depth corresponding to about ¼ of the wavelength (e. g., DVD-ROM disc), the control device 185 can use a TE3 signal as a tracking error signal with respect to a pit signal (emboss signal).

In the case of an optical disc having a guide groove such as, for example, a DVD-RAM disc or DVD-R disc, the control device 185 can use a calculation result value of TE2−k×TE1, obtained by using an appropriate constant k, as a tracking error signal. In this case, the control device 185 can update the value of k in accordance with the type of the optical disc.

Like in the first example, the degree of asymmetry of the tracking error signal caused by the shifting of the central axis of the objective lens 160 with respect to the optical axis of the optical disc apparatus 300 can be sufficiently suppressed. Off-track while the tracking control is performed can be solved. In this example, the polarizing holographic face 750 is divided into small strip-shaped areas. Using these small strip-shaped areas, a light component to be collected before the photodetector 700 and a light component to be collected after the photodetector 700 are generated. The resultant diffraction light is detected as an FE signal. Therefore, the adverse influence of dust and stains present on the substrate 172 of the optical disc 170 is negated. Thus, the focusing error control is highly stable.

In the fifth example, the detected light amount of the 0th order light (transmission light) is used to detect a reproduction signal. The detection index=70/√2=about 50. A higher S/N ratio than that of the first example is guaranteed.

EXAMPLE 6

Figure 8A:
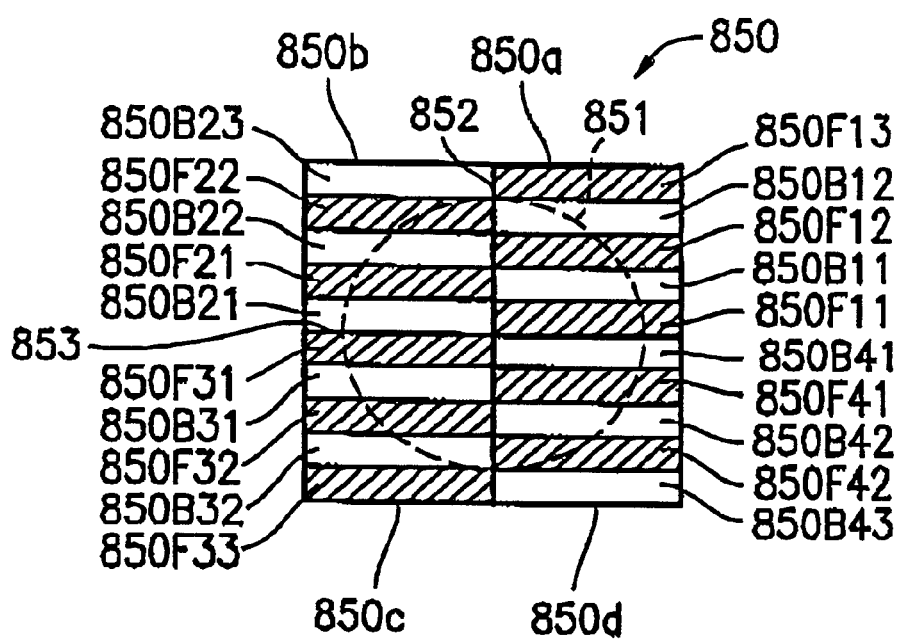
FIG. 8A shows a structure of a polarizing holographic face in an optical disc apparatus according to a sixth example of the present intention.
Figure 8B:
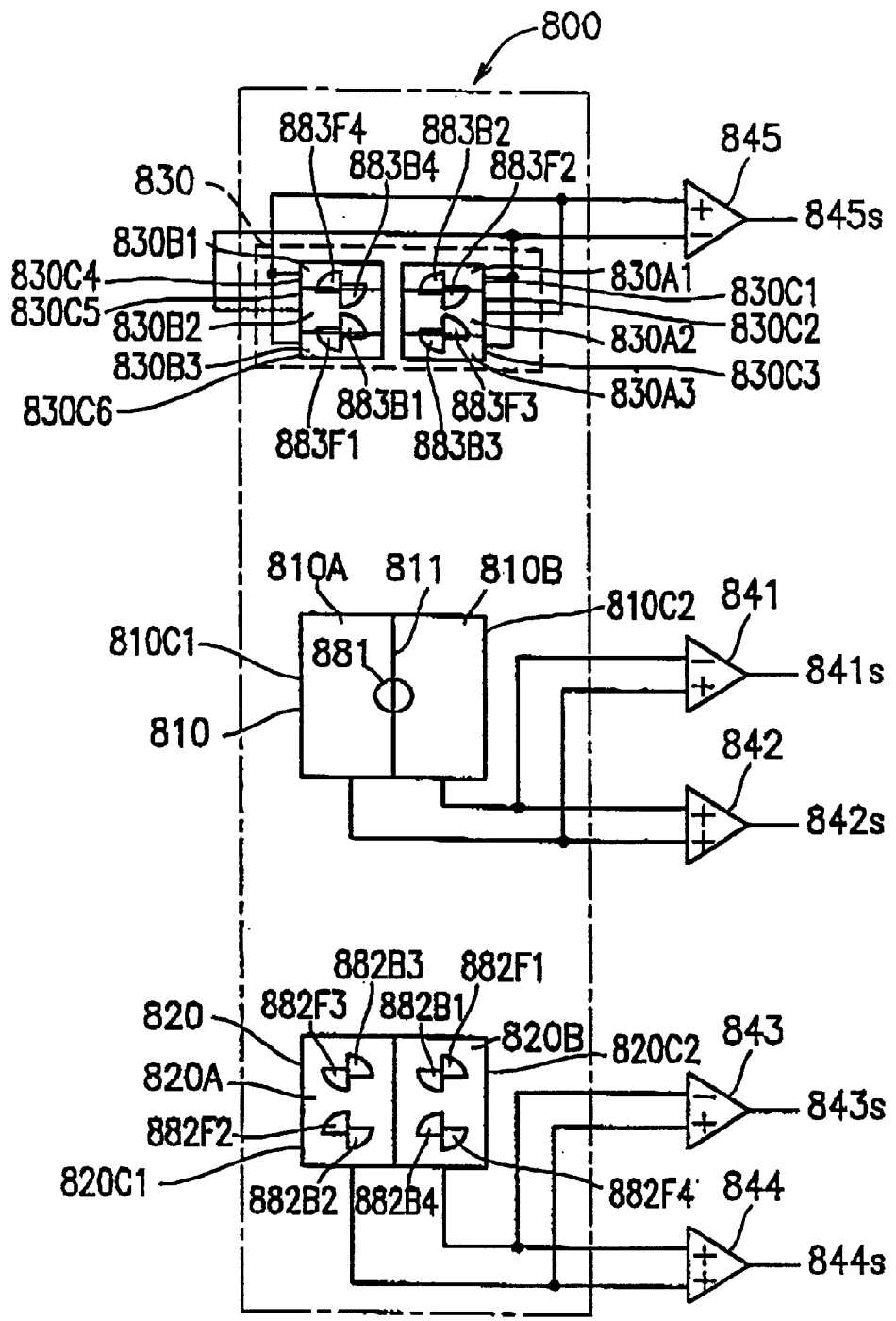
FIG. 8B shows a structure of a photodetector in the optical disc apparatus of the sixth example.

FIG. 8A shows a structure of a polarizing holographic face 850 of an optical disc apparatus according to a sixth example of the present invention. FIG. 8B shows a structure of a photodetector 800 of the optical disc apparatus according to the sixth example of the present invention. The optical disc apparatus according to the sixth example has the same structure as that of the optical disc apparatus 100 in the first example except for the polarizing holographic face 850 and the photodetector 800. The other elements will be described using the corresponding reference numerals in FIG. 1A.

In FIG. 8A, the polarizing holographic face 850 is divided into a first area 850a, a second area 850b, a third area 850c and a fourth area 850d having different holographic patterns, along separation lines 852 and 853. The separation line 852 is parallel to the rotation direction of the optical disc 170, and the separation line 853 is perpendicular to the separation line 852. A light beam 851. reflected by the optical disc 170 is substantially equally divided into four along the separation lines 852 and 853. The first area 850a is further divided into strip-shaped areas 850F11, 850B11, 850F12, 850B12 and 850F13 along separation lines parallel to the separation line 853. The second area 850b is further divided into strip-shaped areas 850B21, 850F21, 850B22, 850F22 and 850B23 along separation lines parallel to the separation line 853. The third area 850c is further divided into strip-shaped areas 85031, 850B31, 850F32, 850B32 and 850F33 along separation lines parallel to the separation line 853. The fourth area 850d is further divided into strip-shaped areas 850B41, 850F41, 850B42, 850F42 and 850B43 along separation lines parallel to the separation line 853.

Negative first order diffraction light passing through the strip-shaped areas having the letter "F" in their reference numerals (e.g., 850F11 or 850F22) is collected before the photodetector 800. Negative first order diffraction light passing through the strip-shaped areas having the letter "B" in their reference numerals (e.g., 850B11 or 850B22) is collected after the photodetector 800.

Referring to FIG. 8B, the photodetector 800 includes a transmission light detector 810, a first diffraction light detector 820 and a second diffraction light detector 830. The transmission light detector 810 is provided in a central area of the photodetector 800. The first diffraction light detector 820 and the second diffraction light detector 830 are provided in a first outer area and a second outer area, respectively, of the photodetector 800 so as to interpose the transmission light detector 810 therebetween.

The transmission light detector 810 includes two sub-transmission light detectors 810A and 810B. The transmission light detector 810 includes two areas 810C1 and 810C2. The sub-transmission light detector 810A is provided in the area 810C1. The sub-transmission light detector 810B provided in the area 810C2. The areas 810C1 and 810C2 are separated from each other by a separation line 811. The separation line 811 extends parallel to the rotation direction of the optical disc 170.

The first diffraction light detector 820 provided in the first outer area includes two sub-diffraction light detectors 820A and 820B. The first diffraction light detector 820 includes areas 820C1 and 820C2. The sub-diffraction light detector 820A is provided in the area 820C1. The sub-diffraction light detector 820B is provided in the area 820C2.

The second diffraction light detector 830 provided in the second outer area includes six sub-diffraction light detectors 830A1, 830A2, 830A3, 830B1, 830B2 and 830B3 like in the third example. The sub-diffraction light detectors 830A1, 830B2 and 830A3 are electrically conductive to each other. The sub-diffraction light detectors 830B1, 830A2 and 830B3 are also electrically conductive to each other. The second diffraction light detector 830 includes areas 830C1, 830C2, 830C3, 830C4, 830C5 and 830C6. The sub-diffraction light detector 830A1 is provided in the area 830C1. The sub-diffraction light detector 830A2 is provided in the area 830C2. The sub-diffraction light detector 830A3 is provided in the area 830C3. The sub-diffraction light detector 830B1 is provided in the area 830C4. The sub-diffraction light detector 830B2 is provided in the area 830C5. The sub-diffraction light detector 830B3 is provided in the area 830C6.

Positive first order diffraction light diffracted by the strip-shaped areas 850B11 and 850B12 of the first area 850a of the polarizing holographic face 850 (FIG. 8A; not adjacent to each other but interposing the area 850F12 therebetween) is collected on the sub-diffraction light detector 820B as a spot 882B1. Negative first order diffraction light diffracted by the strip-shaped areas 850B11 and 850B12 is collected on the sub-diffraction light detector 830B3 while being also on the sub-diffraction light detector 830B2 as a spot 883B1.

Positive first order diffraction light diffracted by the other strip-shaped areas 850F11, 850F12 and 850F13 is collected on the sub-diffraction light detector 820B as a spot 382F1. Negative first order diffraction light diffracted by the strip-shaped areas 850F11, 850F12 and 850F13 is collected on the sub-diffraction light detector 830B2 while being also on the sub-diffraction light detector 830B3 as a spot 883F1.

Positive first order diffraction light diffracted by the strip-shaped areas 850B21, 850B22 and 850B23 of the second area 850b (FIG. 8A; not adjacent to each other but interposing the areas 850F21 and 850F22 therebetween) is collected on the sub-diffraction light detector 820A as a spot 882B2. Negative first order diffraction light diffracted by the strip-shaped areas 850B21, 850B22 and 850B23 is collected on the sub-diffraction light detector 830A2 while being also on the sub-diffract ion light detector 830A1 as a spot 883B2.

Positive first order diffraction light diffracted by the other strip-shaped areas 850F21 and 850F22 is collected on the sub-diffraction light detector 820A as a spot 882F2. Negative first order diffraction light diffracted by the strip-shaped areas 850F21 and 850F22 is collected on the sub-diffraction light detector 830A1 while being also on the sub-diffraction light detector 830A2 as a spot 883P2.

Positive first order diffraction light diffracted by the strip-shaped areas 850B31 and 850B32 of the third area 850c (FIG. 8A: not adjacent to each other but interposing the area 850F32 therebetween) is collected on the sub-diffraction light detector 820A as a spot 882B3. Negative first order diffraction light diffracted by the strip-shaped areas 850B31 and 850B32 is collected on the sub-diffraction light detector 830A2 while being also on the sub-diffraction light detector 830A3 as a spot 88333.

Positive first order diffraction light diffracted by the other strip-shaped areas 850F31, 830P32 and 850F33 is collected on the sub-diffraction light detector 820A as a spot 882F3. Negative first order diffraction light diffracted by the strip-shaped areas 850F31, 850P32 and 850F33 is collected on the sub-diffraction light detector 830A3 while being also on the sub-diffraction light detector 830A2 as a spot 883F3.

Positive first order diffraction light diffracted by the strip-shaped areas 850B41, 850B42 and 850B43 of the fourth area 850d (FIG. 8A; not adjacent to each other but interposing the areas 850F41 and 850F42 therebetween) is collected on the sub-diffraction light detector 820B as a spot 882B4. Negative first order diffraction light diffracted by the strip-shaped areas 850B41, 850B42 and 8S0B43 is collected on the sub-diffraction light detector 830B1 while being also on the sub-diffraction light detector 830B2 as a spot 883B4.

Positive first order diffraction light diffracted by the other strip-shaped areas 850F41 and 850F42 is collected on the sub-diffraction light detector 820B as a spot 882F4. Negative first order diffraction light diffracted by the strip-shaped areas 850F41 and 850F42 is collected on the sub-diffraction light detector 830B2 while being also on the sub-diffraction light detector 830B1 as a spot 883F4.

The light transmitted through the polarizing holographic face 850 (0th order light) is collected at a substantial center of the separation line 811 as a spot 881 The sub-transtission light detectors 810A and 810B of the transmission light detector 810 each detect a light amount. A first tracking error signal 841s (TE1 signal) is obtained by subjecting the detected light amounts to a subtraction performed by a subtracter 841. A reproduction signal 842s is obtained by subjecting the detected light amounts to addition performed by an adder 842. The TE1 signal corresponds to the TE1 signal detected by the photodetector 1050 shown in FIG. 10B.

The sub-diffraction light detectors 820A and 820B of the first diffraction light detector 820 each detect a light amount. A second tracking error signal 843s (TE2 signal) is obtained by subjecting the detected light amounts to a subtraction performed by a subtractor 843. The TE2 signal corresponds to the TE2 signal detected by the photodetector 1190 shown in FIG. 11C.

Based on detection results of the sub-diffraction light detectors 830A1, 830A2, 830A3, 830B1, 830B2 and 830B3, a calculator 845 outputs 830B1+830B3+830A2–830A1–830A3–830B2. The output of the calculator 845 is a focusing error signal 845s (FE signal).

Unlike in the first example, the phase distribution of the wave surface of the light immediately after being transmitted through the polarizing holographic face 850 has a cyclic rectangular shape (so-called two-level grating shape). The phase difference between a lower step and an upper step is significantly small. Therefore, the diffraction light amount ratio can be 70% for the 0th order light, 10% for the positive first order diffraction light and 10% for the negative first order diffraction light. Since the diffraction efficiency of the ±1st order diffraction light is small, the diffraction loss is also small. As a result, the total diffraction light amount (i.e., 70+10+10=90%) is larger than that of the first example. Thus, the light amounts can be adjusted so as to be larger for the transmission light and smaller for the positive first order diffraction light or the negative first order diffraction light. The light amounts can be adjusted so as to be largest for the transmission light, second largest for the negative first order diffraction light, and smallest for the positive first order diffraction light.

In this example, two types of tracking error signals (TE1 and TE2 signals) are obtained. Accordingly, like in the first example, the control device 185 can use a calculation result value of TE2–k×TE1 obtained by using an appropriate constant k, as a tracking error signal in this case, the control device 185 can update the value of k in accordance with the type of the optical disc.

Like in the first example, the degree of asymmetry of the tracking error signal caused by the shifting of the central axis of the objective lens 160 with respect to the optical axis of the optical disc apparatus 300 can be sufficiently suppressed.

Off-track while the tracking control is performed can be solved. In this example, the polarizing holographic face 850 is divided into small strip-shaped areas. Using these small strip-shaped areas, a light component to be collected before the photodetector 800 and a light component to be collected after the photo detector 800 are generated. The resultant diffraction light is detected as an FE signal. Therefore, the adverse influence of dust and stains present on the substrate 172 of the optical disc 170 is negated. Thus, the focusing error control is highly stable.

In the sixth example, the detected light amount of the 0th order light is used to detect a reproduction signal. The detection index=$70/\sqrt{2}$=about 50. A higher S/N ratio than that of the first example is guaranteed. Since the third tracking error signal (TE3 signal) is not obtained, the control device 185 cannot perform tracking of the pit signal (emboss signal) of the optical disc 170 having a pit depth corresponding to about ¼ of the wavelength, such as, for example, a DVD-ROM disc.

In the sixth example, the 0th order light is used to detect a reproduction signal. Alternatively, the detected light amount of the positive first order diffraction light can be used. The light amounts detected by the sub-diffraction light detectors 820A and 820B can be added by the adder 844 to obtain the reproduction signal 844s. In this case, the phase differential distribution of the wave surface of light immediately after being transmitted through the polarizing holographic face 850 is 20% for the 0th order light, 47.6% for the positive first order diffraction light, and 12.4% for the negative first order diffraction light. The detection index of the reproduction signal is $47.6/\sqrt{2}=34$.

EXAMPLE 7

Figure 9A:
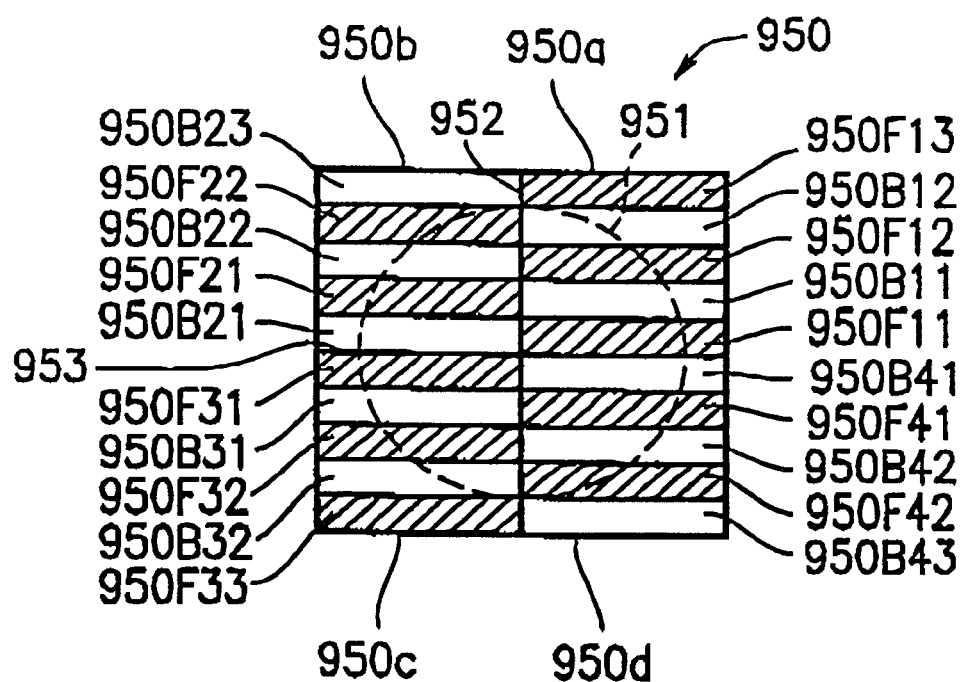
FIG. 9A shows a structure of a polarizing holographic face in an optical disc apparatus according to a seventh example of the present invention.
Figure 9B:
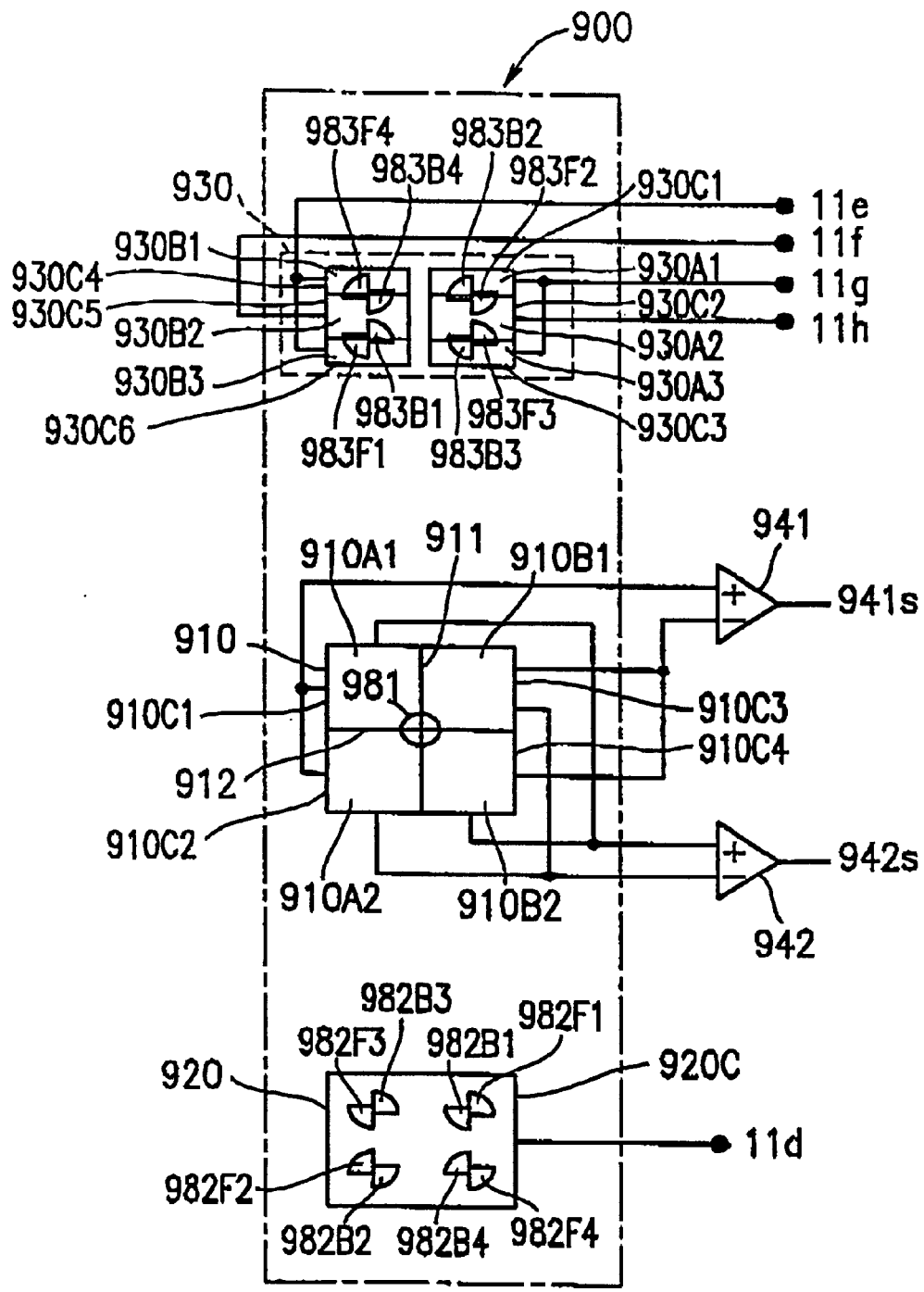
FIG. 9B shows a structure of a photodetector in the optical disc apparatus of the seventh example.

FIG. 9A shows a structure of a polarizing holographic face 950 of an optical disc apparatus according to a seventh example of the present invention. FIG. 9B shows a structure of a photodetector 900 of the optical disc apparatus according to the seventh example of the present invention. The optical disc apparatus according to the seventh example has the same structure as that of the optical disc apparatus 100 in the first example except for the polarizing holographic face 950 and the photodetector 900. The other elements will be described using the corresponding reference numerals in FIG. 1A.

In FIG. 9A, the polarizing holographic face 950 is divided into a first area 950a, a second area 950b, a third area 950c and a fourth area 950d having different holographic patterns, along separation lines 952 and 953. The separation line 952 is parallel to the rotation direction of the optical disc 170, and the separation line 953 is perpendicular to the separation line 952. A light beam 951 reflected by the optical disc 170 is substantially equally divided into four along the separation lines 952 and 953.

The first area 950a is further divided into strip-shaped areas 950F11, 950B11, 950F12, 950B12 and 950F13 along separation lines parallel to the separation line 953. The second area 950b is further divided into strip-shaped areas 950B21, 950F21, 950B22, 950F22 and 950B23 along separation lines parallel to the separation line 953. The third area 950c is further divided into strip-shaped areas 950F31, 950B31, 950F32, 950B32 and 950F33 along separation lines parallel to the separation line 953. The fourth area 950d is further divided into strip-shaped areas 950B41, 950F41, 950B42, 950742 and 950B43 along separation lines parallel to the separation line 953.

Negative first order diffraction light passing through the strip-shaped areas having the letter "F" in their reference numerals (e.g., 950F11 or 950F22) is collected before the photodetector 900. Negative first order diffraction light passing through the strip-shaped areas having the letter "B" in their reference numerals (e.g., 950B11 or 950B22) is collected after the photodetector 900.

Referring to FIG. 9B, the photodetector 900 includes a transmission light detector 910, a first diffraction light detector 920 and a second diffraction light detector 930. The transmission light detector 910 is provided in a central area of the photodetector 900. The first diffraction light detector 920 and the second diffraction light detector 930 are provided in a first outer area and a second outer area, respectively, of the photodetector 900 so as to interpose the transmission light detector 910 therebetween.

The transmission light detector 910 includes four sub-transmission light detectors 910A1, 910A2, 910B1 and 910B2. The transmission light detector 910 includes four areas 910C1, 910C2, 910C3 and 910C4. The sub-transmission light detector 910A1 is provided in the area 910C1. The sub-transtission light detector 910A2 is provided in the area 910C2. The sub-transmission light detector 910B1 is provided in the area 910C3. The sub-transmission light detector 910B2 is provided in the area 910C4. The areas 910C1, 910C2, 910C3 and 910C4 are separated from each other by separation lines 911 and 912 which are perpendicular to each other. The separation line 911 extends parallel to the rotation direction of the optical disc 170.

The first diffraction light detector 920 has an area 920C. The first diffraction light detector 920 is provided in the area 920C.

The second diffraction light detector 930 provided in the second outer area includes six sub-diffraction light detectors 930A1, 930A2, 930A3, 930B1, 930B2 and 930B3 like in the third example. The sub-diffraction light detectors 930A1 and 930A3 are electrically conductive to each other. The sub-diffraction light detectors 930B1 and 930B3 are also electrically conductive to each other. The second diffraction light detector 930 includes areas 930C1, 930C2, 930C3, 930C4, 930C5 and 930C6. The sub-diffraction light detector 930A1 is provided in the area 930C1. The sub-diffraction light detector 930A2 is provided in the area 930C2. The sub-diffraction light detector 930A3 is provided in the area 930C3. The sub-diffraction light detector 930B1 is provided in the area 930C4. The sub-diffraction light detector 930B2 is provided in the area 930C5. The sub-diffraction light detector 930B3 is provided in the area 930C6.

Positive first order diffraction light diffracted by the strip-shaped areas 950B11 and 950B12 of the first area 950a of the polarizing holographic face 950 (FIG. 9A; not adjacent to each other but interposing the area 950F12 therebetween) is collected on the first diffraction light detector 920 as a spot 982B1. Negative first order diffraction light diffracted by the strip-shaped areas 950B13 and 950B12 is collected on the sub-diffraction light detector 930B3 while being also on the sub-diffraction light detector 930B2 as a spot 983B1.

Positive first order diffraction light diffracted by the other strip-shaped areas 950F11, 950P12 and 950P13 is collected on the first diffraction light detector 920 as a spot 982F1. Negative first order diffraction light diffracted by the strip-shaped areas 950F11, 950F12 and 950F13 lo collected on the sub-diffraction light detector 933B2 while being also on the sub-diffraction light detector 930B3 as a spot 983F1.

Positive first order diffraction light diffracted by the strip-shaped areas 950B21, 950B22 and 950B23 of the second area 950b (FIG. 9A; not adjacent to each other but interposing the areas 950F21 and 950F22 therebetween) is collected on the first diffraction light detector 920 as a spot 982B2. Negative first order diffraction light diffracted by the strip-shaped areas 950B21, 950B22 and 950B23 is collected on the sub-diffraction light detector 930A2 while being also on the sub-diffraction light detector 930A1 as a spot 983B2.

Positive first order diffraction light diffracted by the other strip-shaped areas 950F21 and 950F22 is collected on the first diffraction light detector 920 as a spot 982F2. Negative first order diffraction light diffracted by the strip-shaped areas 950F21 and 950F22 is collected on the sub-diffraction light detector 930A1 while being also on the sub-diffraction light detector 930A2 as a spot 983F2.

Positive first order diffraction light diffracted by the strip-shaped areas 950B31 and 950832 of the third area 950c (FIG. 9A; not adjacent to each other but interposing the area 950F32 therebetween) is collected on the first diffraction light detector 920 as a spot 982B3. Negative first order diffraction light diffracted by the strip-shaped areas 950B31 and 950B32 is collected on the sub-diffraction light detector 930A2 while being also on the sub-diffraction light detector 930A3 as a spot 983B3

Positive first order diffraction light diffracted by the other strip-shaped areas 950F31, 950F32 and 950F33 is collected on the first diffraction light detector 920A as a spot 982F3. Negative first order diffraction light diffracted by the strip-shaped areas 950F31, 950F32 and 950F33 is collected on the sub-diffraction light detector 930A3 while being also on the sub-diffraction light detector 930A2 as a spot 983F3.

Positive first order diffraction light diffracted by the strip-shaped areas 950B41, 950B42 and 950B43 of the fourth area 950d (FIG. 9A; not adjacent to each other but interposing the areas 950F41 and 950F42 therebetween) is collected on the first diffraction light detector 920 as a spot 982B4. Negative first order diffraction light diffracted by the strip-shaped areas 950B41, 940B42 and 950B43 is collected on the sub-diffraction light detector 930B1 while being also on the sub-diffraction light detector 930B2 as a spot 983B4.

Positive first order diffraction light diffracted by the other strip-shaped areas 950F41 and 950P42 is collected on the first diffraction light detector 920 as a spot 982F49 Negative first order diffraction light diffracted by the strip-shaped areas 950F41 and 950P42 is collected on the sub-diffraction light detector 930B2 while being also on the sub-diffraction light detector 930B1 as a spot 983F4.

The light transmitted through the polarizing holographic face 950 (0th order light) is collected substantially at an intersection of the separation lines 911 and 912 (in a central area of the transmission light detector 910) a spot 981.

Based on the detection result of the first diffraction light detector 920, a reproduction signal lid is obtained.

Based on detection results of the sub-transmission light detectors 910A1, 910A2, 910B1 and 910B2, a calculator 941 of the photodetector 900 outputs 910A1+910A2−910B1−910B2. The output from the calculator 941 is a first tracking error signal 941s (TE1 signal). The TE1 signal corresponds to the TE1 signal detected by the photodetector 1050 shown in FIG. 10B. Also based on detection results of the sub-transmission light detectors 910A1, 930A2, 910B1 and 910B2, a calculator 942 of the photodetector 900 outputs 910A1+910B2−910A2−910B1. The output from the calculator 942 is a third tracking error signal 9428 (TE3 signal).

Based on detection results of the sub-diffraction light detectors 930A1, 930A2, 930A3, 930B1, 930B2, and 930B3, a detection signal 11*e* corresponding to 930B1+930B3, a detection signal 11*f* corresponding to 93082, a detection signal 11*g* corresponding to 930A1+930A3, and a detection signal 11*h* corresponding to 930A2 are obtained. A second tracking error signal (TE2 signal) is obtained by calculation of 11*g*+11*h*−11*e*−11*f*. A focusing error signal (FE signal) is obtained by calculation of 11*e*−11*f*−11*g*+11*h*. The TE2 signal corresponds to the TE2 signal detected by the photodetector 1190 shown in FIG. 11C.

In this example, the phase distribution of the wave surface of the light Immediately after being transmitted through the polarizing holographic face 950 is similar to that of the first example. The ratio of the diffracted light amount allocated for the 0th order light amount (transmission light amount) is 20%, the ratio for the positive first order diffraction light amount is 47.6%, and the ratio for the negative first order diffraction light amount is 12.4%.

In this example also, three types of tracking error signals (TE1, TE2 and TE3 signals) are obtained. Like in the first example, these tracking error signals can be used in accordance with the type of the optical disc. For example, in the case of an optical disc having a pit depth corresponding to about ¼ of the wavelength (e.g., DVD-ROM disc), the control device 185 can use a TE3 signal as a tracking error signal with respect to a pit signal (emboss signal).

In the case of an optical disc having a guide groove such as, for example, a DVD-RAM disc or DVD-R disc, the control device 185 can use a calculation result value of TE2−k×TE1, obtained by using an appropriate constant k, as a tracking error signal. In the case, the control device 185 can update the value of k in accordance with the type of the optical disc.

Like in the first example, the degree of asymmetry of the tracking error signal caused by the shifting of the central axis of the objective lens 160 with respect to the optical axis of the optical disc apparatus 300 can be sufficiently suppressed. Off-track while the tracking control is performed can be solved. In this example, the polarizing holographic face 950 is divided into small strip-shaped areas. Using these small strip-shaped areas, a light component to be collected before the photodetector 900 and a light component to be collected after the photodetector 900 are generated. The resultant diffraction light is detected as an FE signal. Therefore, the adverse influence of dust and stains present on the substrate 172 of the optical disc 170 is negated Thus., the focusing error control is highly stable. In the seventh example, one detector (the first diffraction light detector 920) is used to detect a reproduction signal. The detection index is about 47.6. A higher S/N ratio than that of the first example is guaranteed.

According to the present invention, two types of tracking error signals (TE1 and TE2 signals), which are conventionally detected, can be simultaneously detected. Thus, the control device 185 generates a sufficiently accurate tracking error signal from the two types of tracking error signals. The control device 185 can use a calculation result value of TE2−k×TE1, obtained by using an appropriate constant k, as a tracking error signal. The polarizing holographic element and the photodetector can be divided in other manners. The diffraction efficiency can be distributed in different manners. The holographic element can be a non-polarizing holographic element or other light distribution element.

According to the present invention, using a calculation result value of TE2−k×TE1 as a tracking error signal, the degree of asymmetry of the tracking error signal caused by the shifting of the objective lens when the laser light crosses the pits is sufficiently suppressed. Off track while the tracking control is performed can be solved. Therefore, satisfactory and stable recording and reproduction can be realized. In the case where a light distribution section, such as a polarizing holographic element or the like, has a pattern having sawtooth-like or step-like shape including three or more steps (the pattern being continuous over sequential cycles), the reproduction signal can have a sufficiently high S/N ratio and thus a high signal reproduction performance is obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disc apparatus capable of mounting an optical disc, comprising:
    a light source for emitting light;
    an objective lens for collecting the light emitted by the light source on the optical disc;
    a first light distribution section integrally movable with the objective lens, the first light distribution section including a first area and a second area, the first light distribution section outputting the light reflected by the optical disc and transmitted through the first area or the second area as transmission light, outputting the light reflected by the optical disc and diffracted by the first area as first diffraction light, and outputting the light reflected by the optical disc and diffracted by the second area as second diffraction light;
    a transmission light detection section for detecting the transmission light by a detector which is divided by a dividing line corresponding to the rotation direction of the optical disc, and for outputting a TE1 signal according to a difference of light amounts each respectively detected by the detector which is divided by a dividing line;
    a first diffraction light detection section for detecting the first diffraction light and the second diffraction light, and outputting a TE2 signal indicating a difference between a light amount of the detected first diffraction light and a light amount of the detected second diffraction light; and
    a control device for obtaining a difference signal between the TE1 signal detected by the transmission light detection section and a signal multiplied by a first proportion constant to the TE2 signal detected by the first diffraction light detection section and using the difference signal as a tracking error signal of the optical disc.

2. An optical disc apparatus according to claim 1, further comprising a second light distribution section for directing the transmission light toward the transmission light detection section, and directing the first diffraction light and the second diffraction light toward the first diffraction light detection section.

3. An optical disc apparatus according to claim 1, wherein:
    the transmission light detection section includes a first sub-transmission light detection section and a second sub-transmission light detection section,
    first transmission light is defined as a part of the transmission light, which is detected by the first sub-transmission light detection section, and second transmission light is defined as a part of the transmission light, which is detected by the second sub-transmission light detection section, and
    the offset of the transmission light is defined as a difference between a light amount of the first transmission light and a light amount of the second transmission light.

4. An optical disc apparatus according to claim 1, wherein the first diffraction light detection section includes a first sub-diffraction light detection section for detecting the first diffraction light and a second sub-diffraction light detection section for detecting the second diffraction light.

5. An optical disc apparatus according to claim 1, wherein the control device obtains the tracking error signal by TE2−k×TE1.

6. An optical disc apparatus according to claim 3, wherein:
    the transmission light detection section includes a third area and a fourth area,
    the first sub-transmission light detection section is provided in the third area, and the second sub-transmission light detection section is provided in the fourth area, and
    a border between the third area and the fourth area is parallel to a rotation direction of the optical disc.

7. An optical disc apparatus according to claim 4, wherein:
    the first diffraction light detection section includes a fifth area and a sixth area,
    the first sub-diffraction light detection section is provided in the fifth area, and the second sub-diffraction light detection section is provided in the sixth area, and
    a border between the fifth area and the sixth area is parallel to a rotation direction of the optical disc.

8. An optical disc apparatus according to claim 5, wherein the control device updates a value of k in accordance with a logical product of a numerical aperture (NA) of the objective lens and a pit pitch (P) of the optical disc in a diameter direction of the optical disc (NA×P).

9. An optical disc apparatus according to claim 5, wherein a value of k is 0.5×S2/S1 or less, wherein S1 is a light amount of the transmission light detected by the transmission light detection section, and S2 is a light amount of the diffraction light detected by the first diffraction light detection section.

10. An optical disc apparatus according to claim 8, wherein the control device sets the value of k at zero when the logical product of the numerical aperture (NA) of the objective lens and the pit pitch (P) of the optical disc in the diameter direction of the optical disc (NA×P) is 0.9 times or more of the wavelength of the light incident on the optical disk.

11. An optical disc apparatus according to claim 5, wherein the control device sets a value of k so that an average output level of TE2−k×TE1 is substantially zero when the control device shifts the objective lens in a diameter direction of the optical disc without performing tracking control.

12. An optical disc apparatus according to claim 1, further comprising an aberration section for providing the transmission light with an aberration, wherein:
    the transmission light detection section includes a third area, a fourth area, a seventh area and an eighth area,
    the first sub-transmission light detection section is provided in the third area,
    the second sub-transmission light detection section is provided in the fourth area,
    the third sub-transmission light detection section is provided in the seventh area, the fourth sub-transmission light detection section is provided in the eighth area, a border between the third area and the fourth area is parallel to a rotation direction of the optical disc, a border between the third area and the eighth area is parallel to a diameter direction of the optical disc, a border between the fourth area and the seventh area is parallel to a diameter direction of the optical disc, a border between the seventh area and the eighth area is parallel to a rotation direction of the optical disc, the third area is orthogonal with respect to the seventh area, the fourth area is orthogonal with respect to the eighth area, and the control device obtains a focusing error signal for the optical disc based on a difference between a sum of a light amount of the transmission light provided with the aberration and detected by the first sub-transmission light detection section and a light amount of the transmission light provided with the aberration and detected by the third sub-transmission light detection section, and a sum of a light amount of the transmission light provided with the aberration and detected by the second sub-transmission light detection section and a light amount of the transmission light provided with the aberration and detected by the fourth sub-transmission light detection section.

13. An optical disc apparatus according to claim 1, further comprising a second diffraction light detection section, wherein:

the first light distribution section outputs the light, reflected by the optical disc and diffracted by the first area of the first light distribution section separately from the first diffraction light, as fifth diffraction light, and outputs the light, reflected by the optical disc and diffracted by the second area of the first light distribution section separately from the second diffraction light, as sixth diffraction light, the second diffraction light detection section includes a seventh sub-diffraction light detection section and an eighth sub-diffraction light detection section, and the control device obtains a focusing error signal for the optical disc based on a difference between a light amount of the fifth diffraction light detected by the seventh sub-diffraction light detection section and a light amount of the sixth diffraction light detected by the eighth sub-diffraction light detection section.

14. An optical disc apparatus according to claim 1, wherein:

the first light distribution section includes a holographic element having a pattern having sawtooth-like or step-like shape including three or more steps, the pattern being continuous over sequential cycles, the first light distribution section outputs the light, reflected by the optical disc and diffracted by the first area of the first light distribution section separately from the first diffraction light, as fifth diffraction light, and outputs the light, reflected by the optical disc and diffracted by the second area of the first light distribution section separately from the second diffraction light, as sixth diffraction light, and a light amount of the first diffraction light and a light amount of the fifth diffraction light both output by the first light distribution section are different from each other, and a light amount of the second diffraction light and a light amount of the sixth diffraction light both output by the first light distribution section are different from each other.

15. An optical disc apparatus according to claim 14, wherein the first diffraction light and the second diffraction light output by the first light distribution section are positive first order diffraction light, and the fifth diffraction light and the sixth diffraction light output by the first light distribution section are negative first order diffraction light.

16. An optical disc apparatus according to claim 15, wherein a light amount of the negative first order diffraction light is substantially zero.

17. An optical disc apparatus according to claim 15, wherein a light amount output by the first light distribution section is largest for the positive first order diffraction light, second largest for the transmission light, and smallest for the negative first order diffraction light.

18. An optical disc apparatus according to claim 15, wherein a light amount output by the first light distribution section is largest for the transmission light, second largest for the positive first order diffraction light, and smallest for the negative first order diffraction light.

19. An optical disc apparatus according to claim 15, wherein a light amount output by the first light distribution section is largest for the transmission light, second largest for the negative first order diffraction light, and smallest for the positive first order diffraction light.

20. An optical disc apparatus according to claim 1, further comprising a second diffraction light detection section, wherein:

the first light distribution section includes a ninth area and a tenth area, the first light distribution section outputs the light reflected by the optical disc and diffracted by the ninth area of the first light distribution section as third diffraction light, outputs the light reflected by the optical disc and diffracted by the tenth area of the first light distribution section as fourth diffraction light, outputs the light, reflected by the optical disc and diffracted by the first area of the first light distribution section separately from the first diffraction light, as fifth diffraction light, and outputs the light, reflected by the optical disc and diffracted by the second area of the first light distribution section separately from the second diffraction light, as sixth diffraction light, the second diffraction light detection section includes an eleventh area, a twelfth area, a thirteenth area, a fourteenth area, a fifteenth area, and a sixteenth area, a seventh sub-diffraction light detection section is provided in the eleventh area, an eighth sub-diffraction light detection section is provided in the twelfth area, a ninth sub-diffraction light detection section is provided in the thirteenth area, a tenth sub-diffraction light detection section is provided in the fourteenth area, an eleventh sub-diffraction light detection section is provided in the fifteenth area, a twelfth sub-diffraction light detection section is provided in the sixteenth area, the third diffraction light is detected by the seventh sub-diffraction light detection section and the eighth sub-diffraction light detection section, the fourth diffraction light is detected by the eleventh sub-diffraction light detection section and the twelfth sub-diffraction light detection section, the fifth diffraction light is detected by the tenth sub-diffraction light detection section and the eleventh sub-diffraction light detection section, the sixth diffraction light is detected by the eighth sub-diffraction light detection section and the ninth sub-diffraction light detection section, and the control device obtains a focusing error signal for the optical disc based on a difference between a total light amount of the diffraction light detected by the seventh sub-diffraction light detection section, the ninth sub-diffraction light detection section and the eleventh sub-diffraction light detection section, and a total light amount of the sub-diffraction light detected by the eighth sub-diffraction light detection section, the tenth sub-diffraction light detection section and the twelfth sub-diffraction light detection section.

21. An optical disc apparatus according to claim 1, further comprising a second diffraction light detection section, wherein:

the first light distribution section includes a ninth area and a tenth area, the first light distribution section outputs the light reflected by the optical disc and diffracted by the ninth area of the first light distribution section as third diffraction light, outputs the light reflected by the optical disc and diffracted by the tenth area of the first light distribution section as fourth diffraction light, outputs the light, reflected by the optical disc and diffracted by the first area of the first light distribution section separately from the first diffraction light, as fifth diffraction light, and outputs the light, reflected by the optical disc and diffracted by the second area of the first light distribution section separately from the second diffraction light, as sixth diffraction light, the second diffraction light detection section includes an eleventh area, a twelfth area, a thirteenth area, a fourteenth area, a fifteenth area, and a sixteenth area, a seventh sub-diffraction light detection section is provided in the eleventh area, an eighth sub-diffraction light detection section is provided in the twelfth area, a ninth sub-diffraction light detection section is provided in the thirteenth area, a tenth sub-diffraction light detection section is provided in the fourteenth area, an eleventh sub-diffraction light detection section is provided in the fifteenth area, a twelfth sub-diffraction light detection section is provided in the sixteenth area, the third diffraction light is detected by the seventh sub-diffraction light detection section and the eighth sub-diffraction light detection section, the fourth diffraction light is detected by the eighth sub-diffraction light detection section and the ninth sub-diffraction light detection section, the fifth diffraction light is detected by the tenth sub-diffraction light detection section and the eleventh sub-diffraction light detection section, the sixth diffraction light is detected by the eleventh sub-diffraction light detection section and the twelfth sub-diffraction light detection section, and the control device obtains a focusing error signal for the optical disc based on a difference between a total light amount of the diffraction light detected by the seventh sub-diffraction light detection section, the ninth sub-diffraction light detection section and the eleventh sub-diffraction light detection section, and a total light amount of the sub-diffraction light detected by the eighth sub-diffraction light detection section, the tenth sub-diffraction light detection section, and the twelfth sub-diffraction light detection section.

22. An optical disc apparatus according to claim 1, wherein:

the first proportion constant is a value which is equal to a second proportion constant multiplied by a sum of light amounts of a first diffraction light and a second diffraction light detected by the detector divided by an amount of transmission light detected by the transmission light detection section.

23. An optical disc apparatus according to claim 22, wherein:

the second proportion constant is a value determined by a depth and a width of a groove of an information layer formed on the optical disc.

24. An optical disc apparatus according to claim 23, wherein:

a tracking error signal TE is given by the following equation TE=(TE2−k×TE1)/S2 (1−m), wherein:

k is a first proportion constant, and m is a second proportion constant, and S2 is a light amount of the diffraction light detected by the first diffraction light detection section.

* * * * *

UNITED STATES PATENT AND TRADEMARK OFFICE
CERTIFICATE OF CORRECTION

PATENT NO. : 6,822,934 B2
DATED : November 23, 2004
INVENTOR(S) : Seiji Nishiwaki et al.

It is certified that error appears in the above-identified patent and that said Letters Patent is hereby corrected as shown below:

<u>Title page,</u>
Item [54], Title, should read -- OPTICAL DISK APPARATUS FOR FINDING A TRACKING ERROR SIGNAL FOR AN OPTICAL DISK --; and
Item [75], Inventor, "Osaki" should read -- Osaka --; and "Takasuki" should read -- Takatsuki --.

Signed and Sealed this

Fifth Day of April, 2005

JON W. DUDAS
*Director of the United States Patent and Trademark Office*